United States Patent [19]

Cameron et al.

[11] Patent Number: 5,581,804
[45] Date of Patent: Dec. 3, 1996

[54] NATIONWIDE COMMUNICATION SYSTEM

[75] Inventors: Dennis W. Cameron, Jackson, Miss.; Walter C. Roehr, Jr., Reston, Va.; Rade Petrovic, Oxford, Miss.; Jai P. Bhagat, Jackson, Miss.; Masood Garahi, Madison, Miss.; William D. Hays, Jackson, Miss.; David W. Ackerman, Washington, D.C.

[73] Assignee: Destineer Corporation, Jackson, Miss.

[21] Appl. No.: 387,228

[22] Filed: Feb. 13, 1995

Related U.S. Application Data

[62] Division of Ser. No. 973,918, Nov. 12, 1992.

[51] Int. Cl.⁶ .................................. H04B 7/26
[52] U.S. Cl. .................. 455/54.1; 455/33.1; 455/56.1; 455/63; 379/59
[58] Field of Search ................ 455/33.1, 33.2, 455/33.4, 53.1, 54.1, 56.1, 62, 63; 379/59, 60

[56] References Cited

U.S. PATENT DOCUMENTS

| | | | |
|---|---|---|---|
| 4,223,405 | 9/1980 | Hattori et al. | 455/59 |
| 4,392,242 | 7/1983 | Kai | 455/34.1 |
| 4,490,830 | 12/1984 | Kai et al. | 455/59 |
| 4,697,281 | 9/1987 | O'Sullivan | 455/33.1 |
| 4,968,966 | 11/1990 | Jasinski et al. | 455/51.2 |
| 5,153,902 | 10/1992 | Buhl et al. | 379/60 |
| 5,243,641 | 7/1993 | Evans et al. | 379/60 |
| 5,305,466 | 4/1994 | Taketsugu | 455/54.1 |

FOREIGN PATENT DOCUMENTS

| | | |
|---|---|---|
| 64-82715 | 3/1989 | Japan . |
| 1181241 | 7/1989 | Japan . |
| WO91/18458 | 11/1991 | WIPO . |
| WO92/11707 | 7/1992 | WIPO . |

OTHER PUBLICATIONS

John D. Spragins, "Telecommunications Protocols and Design," Feb., 1991, pp. 280–281.

Primary Examiner—Reinhard J. Eisenzopf
Assistant Examiner—Thanh Le
Attorney, Agent, or Firm—Finnegan, Henderson, Farabow, Garrett & Dunner, L.L.P.

[57] ABSTRACT

A two-way communication system for communication between a system network and a mobile unit. The system network includes a plurality of base transmitters and base receivers included in the network. The base transmitters are divided into zonal assignments and broadcast in simulcast using multi-carrier modulation techniques. The system network controls the base transmitters to broadcast in simulcast during both systemwide and zonal time intervals. The system network dynamically alters zone boundaries to maximize information throughput. The preferred mobile unit includes a noise detector circuit to prevent unwanted transmissions. The system network further provides an adaptive registration feature for mobile units which controls the registration operations by the mobile units to maximize information throughput.

10 Claims, 30 Drawing Sheets

FOUR CARRIER QUADRATURE MODULATOR

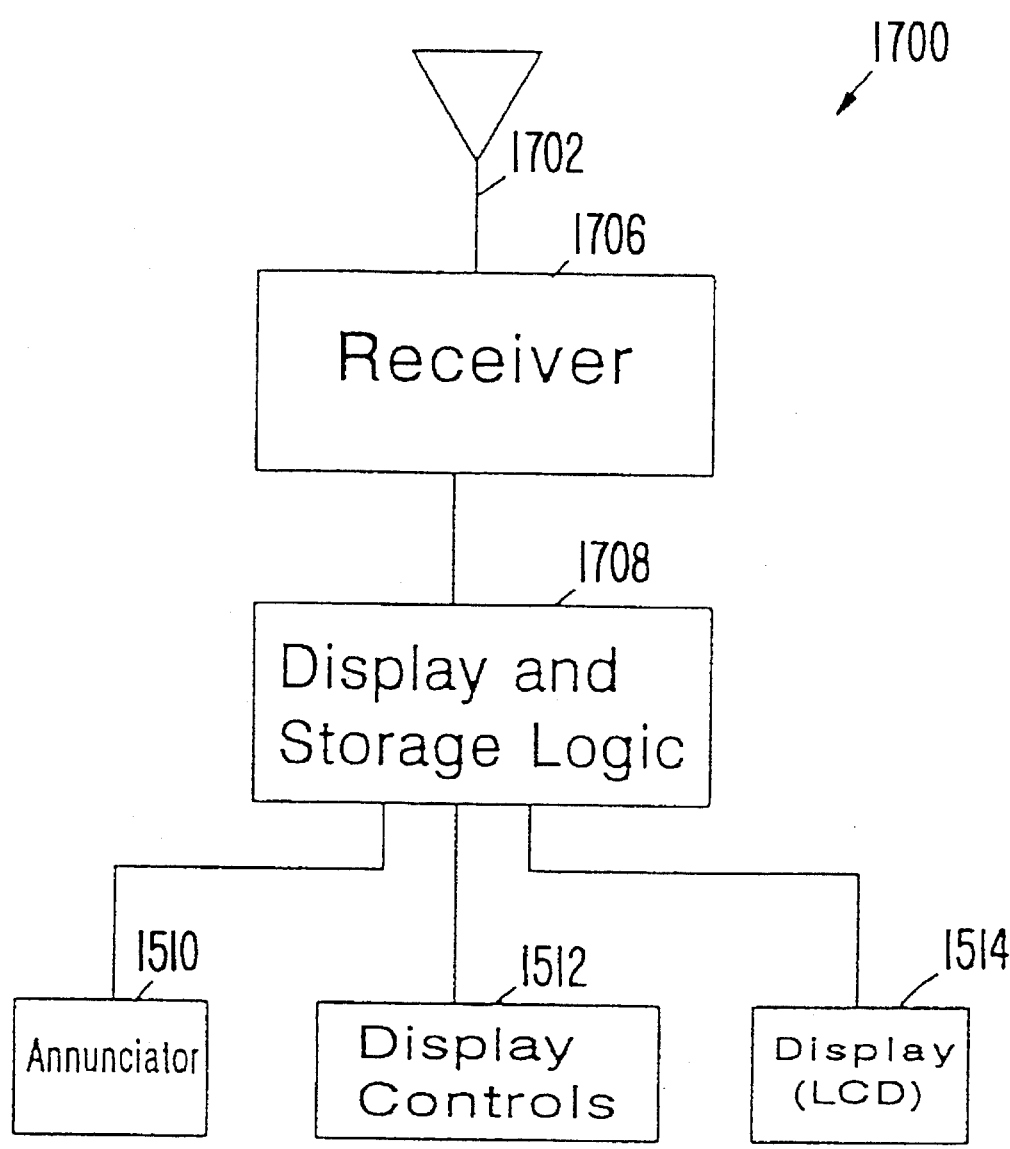

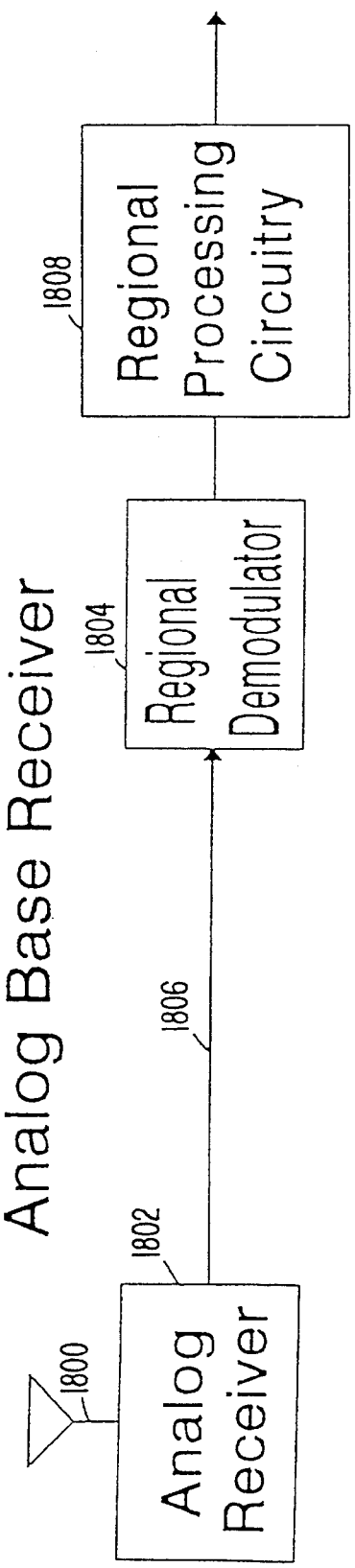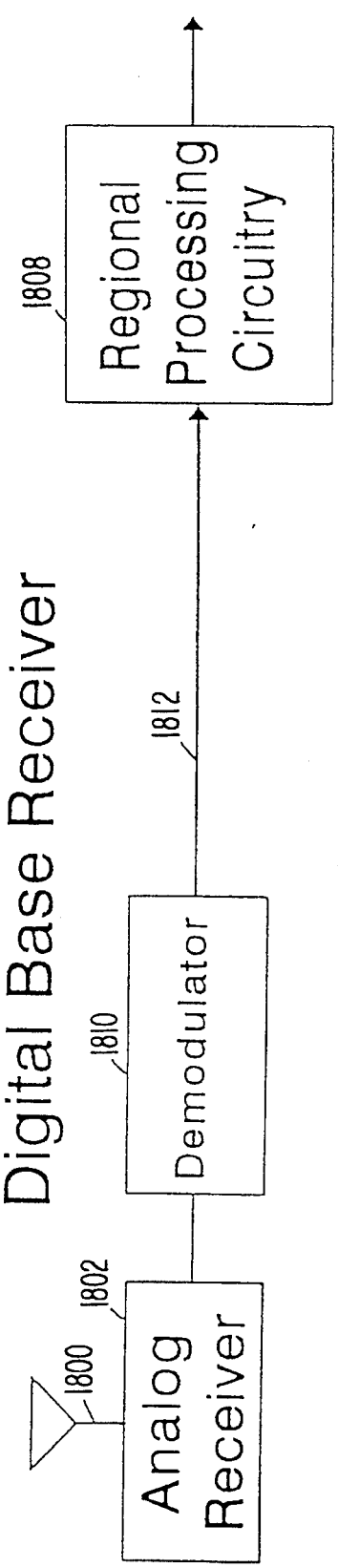

FIG. 21

| User 1 | ID# | Last Location | Transmit Capability? |
|---|---|---|---|
| Service Area | | Message | Rec'd |
| Button Format | | | |

- - - - - - - - - - - - - - - - - - - -

| User 2 | ID# | Last Location | Transmit Capability? |
|---|---|---|---|
| Service Area | | Message | Rec'd |
| Button Format | | | |

- - - - - - - - - - - - - - - - - - - -

2102, 2104, 2106, 2100, 2108, 2110, 2112

User Database

FIG. 22

| 2202 | 2204 | 2206 | 2208 | 2210 |
|---|---|---|---|---|
| User 1 | No. of Probe Signals Sent | No. of Registration Signals Received | No. of Messages Successfully Delivered | Other Traffic Data |
| User 2 | No. of Probe Signals Sent | No. of Registration Signals Received | No. of Messages Successfully Delivered | Other Traffic Data |
| User 3 | No. of Probe Signals Sent | No. of Registration Signals Received | No. of Messages Successfully Delivered | Other Traffic Data |
| User 4 | No. of Probe Signals Sent | No. of Registration Signals Received | No. of Messages Successfully Delivered | Other Traffic Data |
| ⋮ | | | | |

2200

Traffic Database

FIG. 23

Service Queue

| Current Messages | |
|---|---|
| ID# | Data Location |
| 2302 | 2308 |
| 2304 | 2310 |
| 2306 | 2312 |
| ⋮ | ⋮ |

| Probe List | |
|---|---|
| ID# | Data Location |
| 2314 | 2320 |
| 2316 | 2322 |
| 2318 ⋮ | 2324 ⋮ |

| Base Transmitter 1 | Zonal Assignment | Base Receivers in Coverage Area | Other Data |
| --- | --- | --- | --- |
| Base Transmitter 2 | Zonal Assignment | Base Receivers in Coverage Area | Other Data |
| Base Transmitter 3 | Zonal Assignment | Base Receivers in Coverage Area | Other Data |
| Base Transmitter 4 | Zonal Assignment | Base Receivers in Coverage Area | Other Data |

Base Transmitter Database

FIG. 27(A) Cycle Protocol

| Cycle Header | Systemwide FWD Interval | Systemwide Reverse Interval | Zonal FWD Interval | Zonal Reverse Interval | Reverse Contention Interval |
|---|---|---|---|---|---|
| 2702 | 2704 | 2706 | 2708 | 2710 | 2712 |

2700

FIG. 27(B) Forward Interval Protocol

| Forward Interval Header | Batch i | Batch j | Batch k |
|---|---|---|---|
| 2714 | 2720 | 2722 | 2724 |

2750

FIG. 27(C) Individual Batch Protocol

| Batch Header | Individual Message | | |
|---|---|---|---|
| 2726 | 2732 | | |

2780

NATIONWIDE COMMUNICATION SYSTEM

This is a division of application Ser. No. 07/973,918, filed Nov. 12, 1992.

BACKGROUND OF THE INVENTION

A. Field of the Invention

The present invention relates to methods and systems for providing two-way communication capability between a central network and a mobile unit over a relatively large area, and more particularly to such methods and systems which allow for rapid communication of large messages and efficient use of system resources.

B. Description of the Related Art

Conventional two-way portable/mobile wireless messaging systems often provide a variety of services to subscribers. Conventional messaging systems in particular provide one-way services using store and forward techniques to mobile receivers carried by the subscriber. A fundamental goal of two-way messaging systems is to provide a network of interconnected transmitters and receivers which provides sufficient transmitted signal strength and receive capability to uniformly cover a geographic region. Some conventional messaging systems provide the message to the user on a small viewing screen on the mobile unit.

However, such conventional systems often suffer from problems associated with low system throughput, evidenced by slow message delivery and message size limitations and do not provide an acknowledgment feature wherein the mobile unit transmits an acknowledgment signal to the system to acknowledge receipt of the message from the system. Generally, system throughput refers to the overall communication capability of a system as defined by the total amount of message data from the system to the mobile units transferred by the system during a given period of time divided by the frequency bandwidth necessary to transmit the message data and may be measured in bits transferred per Hz. Further, such conventional systems suffer from technical problems preventing consistent wide area coverage and would require extremely wide portions of valuable frequency bandwidth to achieve acceptable system throughput rates.

Simulcast technology in communication systems was originally developed to extend transmitter coverage beyond that which could be obtained from a single transmitter. Over time, however, simulcasting has evolved into a technique capable of providing continuous coverage to a large area.

Generally, simulcast technology provides multiple transmitters, operating on substantially the same frequencies and transmitting the same information positioned to cover extended areas. As shown in FIG. 1, transmitter 100 generally provides coverage over area A, D, and E, transmitter 102 generally provides coverage over area B, D, and E, and transmitter 104 generally provides coverage over area C, E, and F. In some cases, the coverage area of a first transmitter may be entirely enclosed within the coverage area of another transmitter, such as in building interiors and valleys. In areas where one (and only one) transmitter dominates (e.g., areas A, B, and C in FIG. 1), simulcast is effective because the other transmitters do not significantly affect receivers in those areas.

However, in "overlap" areas D, E, and F shown in FIG. 1, where the signals from two or more transmitters are approximately equal, problems can arise because destructive interference of signals occurs in these overlap areas such as areas D, E, and F. Destructive interference occurs when the two signals are equal in magnitude and 180° out of phase and completely cancel each other. While there were some successes, reliable design procedures were not available.

Attempting to precisely synchronize the carrier frequencies of all simulcast transmitters does not overcome the problem because points (i.e. nodes) at which destructive summing occurred persisted for long periods of time. At such points, a mobile receiver can not receive the simulcast signal.

Deliberately offsetting the carrier frequencies of adjacent transmitters can ensure that destructive interference does not persist at one point for an extended period of time. The slight errors in frequency displayed by high quality reference oscillators (e.g., 20 hertz errors in 100 MHz signals or a few parts in $10^7$) render deliberate offsetting unnecessary. Further, merely offsetting the carrier frequencies could not guarantee acceptable quality demodulation because proper alignment of the modulating signals in time is also required.

FIG. 2 displays the situation at, for example, point D in FIG. 1 when modulating waveforms are synchronized and includes coverage boundary 202 from a first transmitter and a second transmitter coverage boundary 204 from a second adjacent transmitter. An equi-signal boundary 200 exists where the signals from the first and second transmitters have approximately equal signal strengths. A more realistic equi-signal boundary would take into account natural and man-made topography and propagation conditions, and therefore would probably not be a straight line.

FIGS. 3 and 4 generally illustrate various signals as they may occur at or near the equi-signal boundary 200 as shown in FIG. 2. In particular, FIGS. 3 and 4 illustrate various aspects of modulation synchronization and how altering transmission parameters may affect the synchronization. In general, there are at least three sources which cause the signals from the first transmitter and the second transmitter to be out of synchronization: (1) timing shifts in the delivery of the modulating waveform to each of the transmitters; (2) timing shifts internal to each transmitter; and (3) timing shifts caused by propagation distances and anomalies. From the perspective of a receiver located in an overlap area, these three sources of timing shifts combine to produce an overall timing shifts between the received signals from the first and second transmitters. In current commercial practice, the summation of these three components results in time shifts of about 200 microseconds. The timing shift present in simulcast systems disadvantageously limits the baud rate at which information may be transferred. In general, FIGS. 3 and 4 will also illustrate how timing shifts prevents high baud rate transmissions.

A time line representation of a signal 306 from a first transmitter is shown in FIG. 3(A) and a signal 308 from a second transmitter is shown in FIG. 3(B), both from the perspective of a receiver located in an overlap area. Vertical dashed lines 300 represent baud intervals on the time axis. As can be seen from FIGS. 3(A) and (B), the signals 306 and 308 are frequency modulated between a high and a low frequency value and the signals 306 and 308 are exactly in phase. As will be appreciated, the timing shift between signals 306 and 308 must be small when compared to the baud interval shown in FIGS. 3(A) and (B) since signals 306 and 308 are in synchronization. Of course, as the baud interval decreases, the timing shifts will likely cause signals 306 and 308 to be out of synchronization.

FIGS. 3(C), (D), and (E) show the summation of these two signals 306 and 308 at an equi-signal boundary, such as boundary 200 in FIG. 2. FIG. 3(C) shows a composite signal 310 indicating that the frequency information remains unchanged, FIG. 3(D) shows a linear graph 312 of the relative phase difference caused by a slight carrier frequency difference between the signals from the first transmitter and the second transmitter. FIG. 3(E) shows a composite amplitude signal 314. A noise threshold is indicated by the horizontal dashed line 304 in FIG. 3(E).

Of interest, FIG. 3(E) shows the composite amplitude signal 314 dipping below the noise threshold 304 at an anti-phase condition 302 (e.g., when the relative phase angle is ±180°, as shown in FIG. 3(D)). As can be seen from FIG. 3(E), the anti-phase condition 302 caused by the slight phase shift between transmitter 1 and transmitter 2 will not cause any loss of data because the anti-phase condition persists for only a small portion of the baud interval.

The slight offset of the carrier frequencies between the first and second transmitters causes a slow drift of the relative phase of the two signals, as shown in FIG. 3(D). When the signals are ±180° out of phase, the temporary dip in the amplitude signal may cause the loss of a few bits in the composite signal, at worst. These errors can be counteracted with a conventional error correcting code, such as is commonly known.

FIG. 4 shows a set of similar signals to those in FIG. 3, but wherein the signal 402 from the first transmitter is offset from, or out of synchronization with, the signal 404 from the second transmitter by a full baud. In particular, signal 404 lags signal 402 by one baud interval. As previously discussed, the offset of signals 402 and 404 may be caused by various timing shifts in the delivery of both signals 402 and 404 to a receiver in an overlap area. FIGS. 4(A) and (B) illustrate the extreme case where the sum of these timing shifts is equal to the baud interval shown by dashed lines 400. As can be seen in FIG. 4(C), composite signal 406 includes a period of indeterminate frequency which undesirably covers several entire baud intervals and, therefore, successful demodulation is impossible during those baud intervals. If the baud interval were increased to minimize the effect of these timing shifts, data loss would be less likely. Therefore, it can be seen that the baud rate at which good data transfer can be accomplished is limited by the timing shifts between signals delivered to receivers in overlap areas.

Through these examples, it can be seen that high degrees of modulation synchronization make it possible to obtain good data demodulation in a simulcast system. However, the baud rate limitation of simulcast systems is a significant drawback and limits system throughput.

An alternative to simulcast for wide area coverage is assignment of orthogonal, non-overlapping subdivisions of the available system capacity to adjacent areas. Subdivisions can be made in time (e.g., broadcasting the information on the same frequency in different time slots to adjacent areas), or in frequency (e.g., broadcasting the information simultaneously on different frequencies in adjacent areas). There are several problems with such orthogonal systems, however. First, orthogonal assignments require tuning the receiver to the assigned frequency or time channel for the area in which the receiver currently resides. In the broadcast services every traveler has experienced the frustration of finding the correct channel for their favorite programs. Simulcast operation avoids the need for scanning and re-tuning as the mobile unit moves between areas. Such scanning and re-tuning also disadvantageously increases mobile unit power consumption.

Second, and more serious, the orthogonal assignment approach drastically reduces the system throughput capacity as measured in bits per Hz because anywhere from 3 to 7, or possibly more, orthogonal assignments are required to obtain continuous area coverage in most conventional orthogonal systems. This waste of capacity is somewhat recouped if the same information is not needed throughout the service area because a given piece of information is sent only to those cells where it is needed.

Conventional cellular radio service is a typical example of an orthogonal system. In cellular, the same frequencies are reused in spatially separated cells to allow different data to be transmitted to different mobile units. An example of three cellular arrangements is shown in FIG. 5 where the number of cells (N) is equal to 3, 4, and 7. Each cell (i.e., A, B, C, . . .) in conventional cellular service usually only includes a single transmitter and operates in a different frequency or time division within the communication protocol. As shown in FIG. 5, cellular service generally locates transmitters utilizing the same division (all the "A" transmitters) far enough apart to reduce the likelihood of interference between such transmitters. As the number of cells increases, the likelihood of interference decreases. For example, with N=3 as shown by arrangement 500 in FIG. 3, the distance between the coverage area of "A" cells is about ½ cell width, with N=4 in arrangement 502, the distance between the coverage areas of "A" cells is slightly larger, and with N=7 in arrangement 504 the distance between "A" cells is larger than the width of one cell.

However, as the number of cells increases, the length of the individual time intervals per cell decreases for time division multiplexed systems, thereby decreasing the systems total information transfer. In frequency division systems, more cells undesirably increases the frequency bandwidth required. Therefore, system throughput in bits per Hz is decreased as the number of cells increases. Furthermore, cellular systems often require an electronic "handshake" between system and mobile unit to identify the specific cell (i.e. transmitter) in which the mobile unit is located to allow capacity reuse.

SUMMARY OF THE INVENTION

The systems and methods of the present invention have a wide variety of objects and advantages. The systems and methods of the present invention have as a primary object to provide a communication system with wide area coverage and high message throughput while minimizing frequency bandwidth usage.

It is an object of the invention to provide a simulcast communication system with a high data transfer rate which does not exceed the baud rate limitations of simulcast transmission.

It is a further object of the present invention to provide a communication system which provides for superior data communication integrity.

Yet another object of the invention is to provide a mobile transceiver unit which prevents unnecessary RF interference, particularly on commercial aircraft.

Still further, it is an object of the invention to provide a zone based communication system which may dynamically redefine zone boundaries to improve information throughput.

Another object of the invention is to provide a zone based simulcast communication system which can effectively communicate with both mobile transceiver units located near the center of each zone as well as mobile transceiver units located within the overlap areas between two or more zones.

Additional objects and advantages of the invention will be set forth in part in the description which follows, and in part will be obvious from the description, or may be learned by practicing the invention. The objects and advantages of the invention will be realized and attained by means of the elements and combinations particularly pointed out in the appended claims.

To achieve the objects and in accordance with the purpose of the invention, as embodied and broadly described herein, the invention is directed to a method for information transmission by a plurality of transmitters to provide broad communication capability over a region of space, the information transmission occurring during at least both a first time period and a second time period and the plurality of transmitters being divided into at least a first and second set of transmitters, the method comprising the steps of (a) generating a system information signal which includes a plurality of blocks of information, (b) transmitting the system information signal to the plurality of transmitters, (c) transmitting by the first and second sets of transmitters a first block of information in simulcast during the first time period, (d) transmitting by the first set of transmitters a second block of information during the second time period, and (e) transmitting by the second set of transmitters a third block of information during the second time period.

In another embodiment, the invention is directed to a multi-carrier simulcast transmission system for transmitting in a desired frequency band a message contained in an information signal, the system comprising a first transmitter means for transmitting an information signal by generating a first plurality of carrier signals within the desired frequency band and by modulating the first plurality of carrier signals to convey the information signal, and a second transmitter means, spatially separated from the first transmitter, for transmitting the information signal in simulcast with the first transmitter by generating a second plurality of carrier signals at substantially the same frequencies as the first plurality of carrier signals and by modulating the second plurality of carrier signals to convey the information signal.

In another embodiment, the invention is directed to a communication method implemented in a computer controlled communication network for locating a mobile transceiver within a region of space, the region of space being divided into a plurality of zones with each zone serviced by at least one base transmitter and at least one base receiver, the network storing data corresponding to a zone where the mobile transceiver was last known to be located, the communication method comprising the steps of (a) transmitting a message signal by a base transmitter servicing a zone where the mobile transceiver was last known to be located, (b) transmitting a systemwide probe signal by a plurality of base transmitters servicing a plurality of zones if the mobile transceiver does not indicate receipt of the message signal from the base transmitter, (c) receiving the regional probe signal by the mobile transceiver, (d) transmitting an acknowledgment signal by the mobile transceiver in response to the received regional probe signal, (e) receiving the acknowledgment signal from the mobile transceiver by a base receiver, and (f) updating the data to reflect the zone of the base receiver that received the acknowledgment signal as the last known location of the mobile transceiver.

In yet another embodiment, the invention is directed to a method of communicating messages between a plurality of base transmitters and mobile receivers within a region of space divided into a plurality of zones with each zone having at least one base transmitter assigned thereto, the communication method comprising the steps of (a) transmitting substantially simultaneously a first information signal and a second information signal to communicate messages to the mobile receivers, the first information signal being transmitted in simulcast by a first set of base transmitters assigned to a first zone, and the second information signal being transmitted in simulcast by a second set of base transmitters assigned to a second zone, (b) dynamically reassigning one or more of the base transmitters in the first set of base transmitters assigned to the first zone to the second set of base transmitters assigned to the second zone as a function of the messages to be communicated in an area, thereby creating an updated first set of base transmitters and an updated second set of base transmitters, and (c) transmitting substantially simultaneously a third information signal and a fourth information signal, the third information signal being transmitted in simulcast by the updated first set of base transmitters, and the fourth information signal being transmitted in simulcast by the updated second set of base transmitters to communicate additional messages to said mobile receivers.

In another embodiment, the invention is directed to a mobile transceiver unit for transmitting messages to and receiving messages from a network comprising input means for allowing the user to input a user message to the unit, transmitter means for transmitting a radio frequency signal including the user message from the mobile unit to the network, receiver means for receiving radio frequency signals having a message from the network, signal detector means for detecting at least one type of electromagnetic signal generated external to the mobile unit and the network, and a circuit, connecting the signal detector means to the transmitter means, for disabling the transmitter means upon detection of the electromagnetic signal, thereby preventing unwanted radio frequency transmission.

In another embodiment, the invention is directed to a communication method for controlling a mobile transceiver which may communicate with a communication network controlled by a computer, the network including a plurality of base transmitters for transmitting messages from the network to the mobile transceiver and base receivers for receiving messages from the mobile transceiver, the mobile transceiver being capable of sending a registration signal to be received by a base receiver in the network to identify the mobile transceiver's location and the plurality of base transmitters in the network being capable of sending a probe signal to the mobile transceiver to cause the mobile transceiver to transmit a signal to a base receiver to identify its location, the method comprising the steps of (a) sending a message from the network to the mobile transceiver to disable the mobile transceiver's capability to transmit a registration signal, (b) storing the number of probe signals sent by the network to the mobile transceiver during a first period of time and the number of messages successfully delivered to the mobile transceiver by the network during a second period of time, (c) processing by the computer the stored number of probe signals and number of messages successfully delivered to evaluate a likelihood that a probe signal will be required to be sent by the network to locate the mobile unit to deliver a message, and (d) sending a message to the mobile unit to enable the mobile transceiver's capability to transmit a registration signal if the calculated likelihood exceeds a selected value.

Finally, in another embodiment, the invention is directed to a communication method for controlling a mobile transceiver which may communicate with a communication network controlled by a computer, the network including a plurality of base transmitters for transmitting messages to the mobile transceiver and base receivers for receiving messages from the mobile transceiver, the mobile transceiver being capable of sending a registration signal to be received by a base receiver in the network to identify the mobile transceiver's location, the network using received registration signals to determine a set of base transmitters to be operated to transmit a message to the mobile transceiver, the method comprising the steps of (a) sending a message from the network to the mobile transceiver to enable the mobile transceiver's capability to transmit a registration signal, (b) storing the number of registration signals from the mobile transceiver to the network during a first period of time and the number of messages successfully delivered to the mobile transceiver by the network during a period of time, (c) processing the stored number of registration signals and number of messages successfully delivered to evaluate a likelihood that a registration signal from said mobile unit will not be used by the network to determine a set of base transmitters, and (d) sending a message to the mobile unit to disable the mobile transceiver's capability to transmit a registration signal if the likelihood exceeds a selected value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 17 is a schematic diagram of a mobile receiver;

FIG. 18(A) is a schematic diagram of an analog base receiver;

FIG. 18(B) is a schematic diagram of a digital base receiver;

FIG. 21 is a schematic diagram of a database structure;

FIG. 22 is a schematic diagram of a traffic database;

FIG. 23 is a schematic diagram of a service queue;

FIG. 24 is a schematic diagram of a base transmitter database;

FIG. 27(A) is a schematic diagram of the cycle protocol;

FIG. 27(B) is a schematic diagram of the forward batch interval protocol;

FIG. 27(C) is a schematic diagram of the individual batch protocol;

DESCRIPTION OF THE PREFERRED EMBODIMENTS

Reference will now be made in detail to the present preferred embodiments and exemplary embodiments of the invention, examples of which are illustrated in the accompanying drawings. Wherever possible, the same reference numbers will be used throughout the drawings to refer to the same or like parts.

A. Overview of The System Hardware

Figure 6:
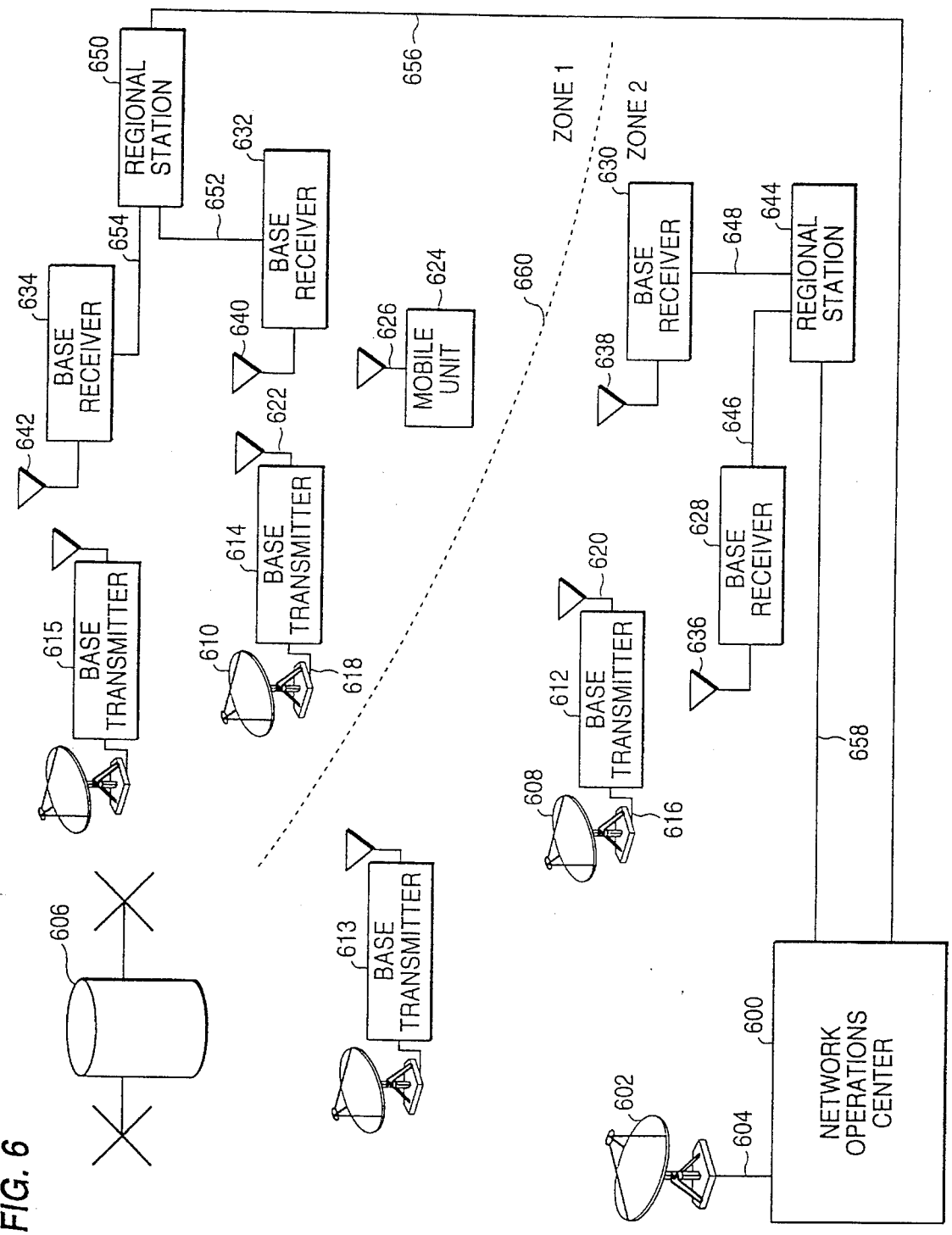
FIG. 6 is a schematic diagram of a communication system.

FIG. 6 shows an overview of the major elements of a preferred communication system according to the present invention. As shown therein, the communication system includes a network operations center 600 which is connected to a satellite uplink 602 via data path 604. A satellite uplink is used to provide data to satellite 606. Satellite 606 redirects the received data to several satellite downlink stations including station 608 and station 610. Conventional satellite technology allows for nominal data transfer rates of 24M bits/second. Further, conventional satellite technology allows for accurate delivery of data to stations 608 and 610, which allows for precise synchronization between the signals broadcast in simulcast by the stations 608 and 610. It should be understood that stations 608 and 610 may optionally receive identical data, or may individually receive different data simultaneously from the satellite 606.

Satellite downlink stations 608 and 610 are connected to spatially separated base transmitters 612 and 614 via data paths 616 and 618, respectively. Base transmitter 612 is connected to antenna 620, and base transmitter 614 is connected to antenna 622. Preferably, the base transmitters of the present system have a power output capability of about 350 watts, which will provide an effective transmitter coverage area of several tens of miles. Although not shown in FIG. 6, each zone preferably includes multiple transmitter stations as will be evident from the following discussion.

Mobile unit 624 is connected to antenna 626 and, in the preferred embodiment, is a small, portable unit capable of being carried easily by a user and therefore is similar to conventional pagers in those aspects. More preferably, the mobile unit has both receive and transmit capability, with a nominal transmit power output of about 1 watt.

The communication system includes several base receivers 628, 630, 632, and 634 each connected to antennas 636, 638, 640, and 642, respectively. Base receivers 628 and 630 are connected to a regional station 644 via data paths 646 and 648, respectively. Base receivers 632 and 634 are connected to regional station 650 via data paths 652 and 654, respectively. Base transmitters 612, 614 preferably have a large transmit power output capability to provide coverage to the mobile unit in areas to which communication is typically difficult, such as building interiors, and to extend the coverage area of each transmitter. An appropriate number of base receivers should be dispersed throughout the geographic area to reliably receive the signals from the mobile unit. Due to the difference in output power between base transmitters and mobile units, an overall ratio of 10 base receivers to 1 base transmitter may be appropriate, and the 2 to 1 ratio shown in FIG. 6 is merely shown for ease of illustration.

Regional station 650 is connected to the network operations center 600 via data path 656 and regional station 644 is connected to the network operations center 600 via data path 658. The data paths 656 and 658 preferably include low cost phone lines, but may include any convenient and appropriate data transfer technology.

Figure 1:
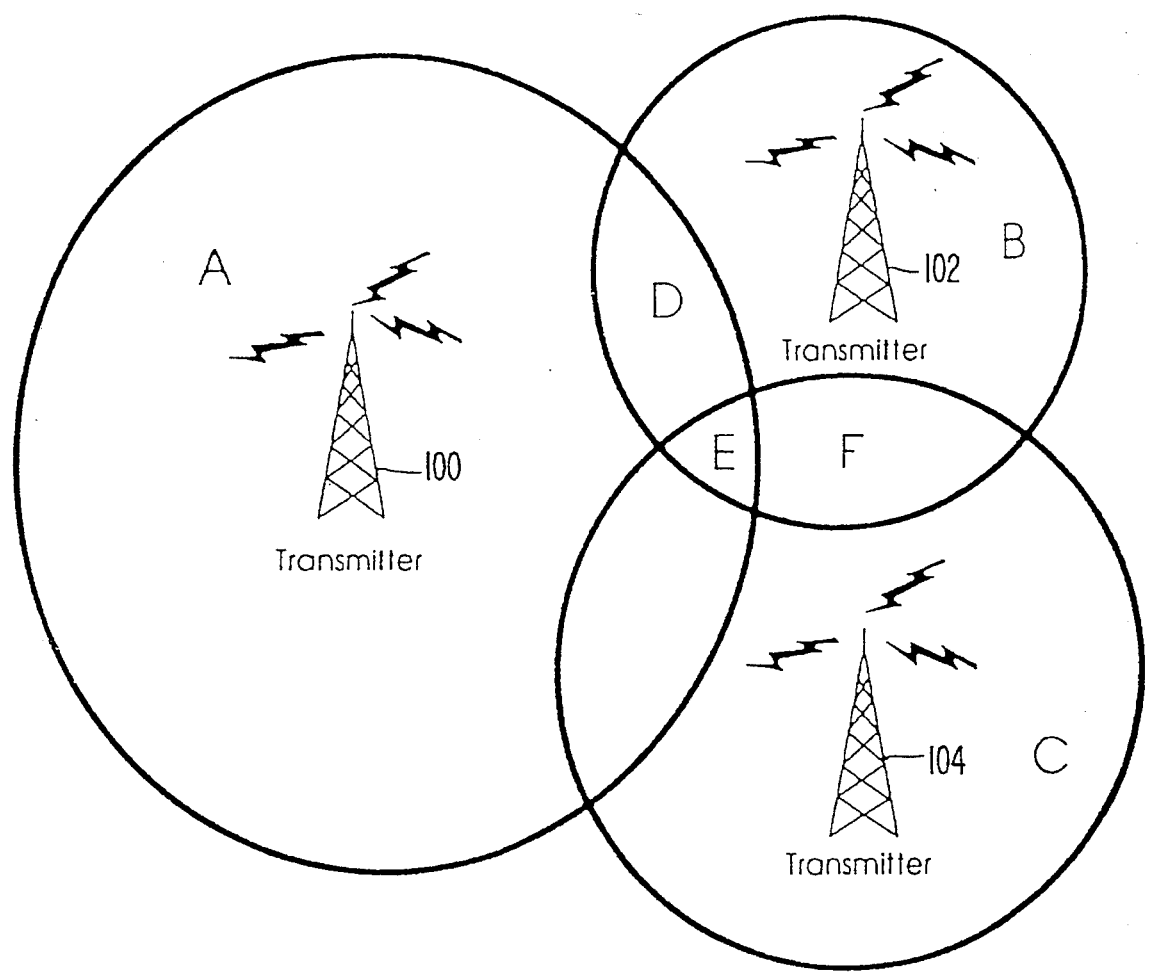
FIG. 1 is a schematic diagram of an arrangement of simulcast transmitters.

Generally, the communication system of the present invention roughly divides various regions of space into portions called zones. Each zone must have one or preferably more base transmitters assigned to it. Zone boundaries are roughly defined by the transmitter coverage areas of the base transmitters assigned to that zone. For example, FIG. 6 shows a dashed zone dividing line 660 roughly dividing a zone 1 from a zone 2. Zone 1 includes base transmitter 614, base receivers 632 and 634, regional station 650, and mobile unit 624. Zone 2 includes base transmitter 612, base receivers 628 and 630, and regional station 644. Dashed line 660 only roughly defines the boundary between zones because precise boundaries do not exist. For example, to insure adequate coverage of the region, as shown in FIG. 1, the range of both transmitter 614 should at least cover the region above dashed line 660, and preferably should extend somewhat below dashed line 660. Similarly, the range of base transmitter 612 should at least cover the region below dashed line 660, and preferably should extend somewhat above dashed line 660. As can be seen, an overlap of transmitter coverage may occur in the vicinity of dashed line 660

Figure 2:
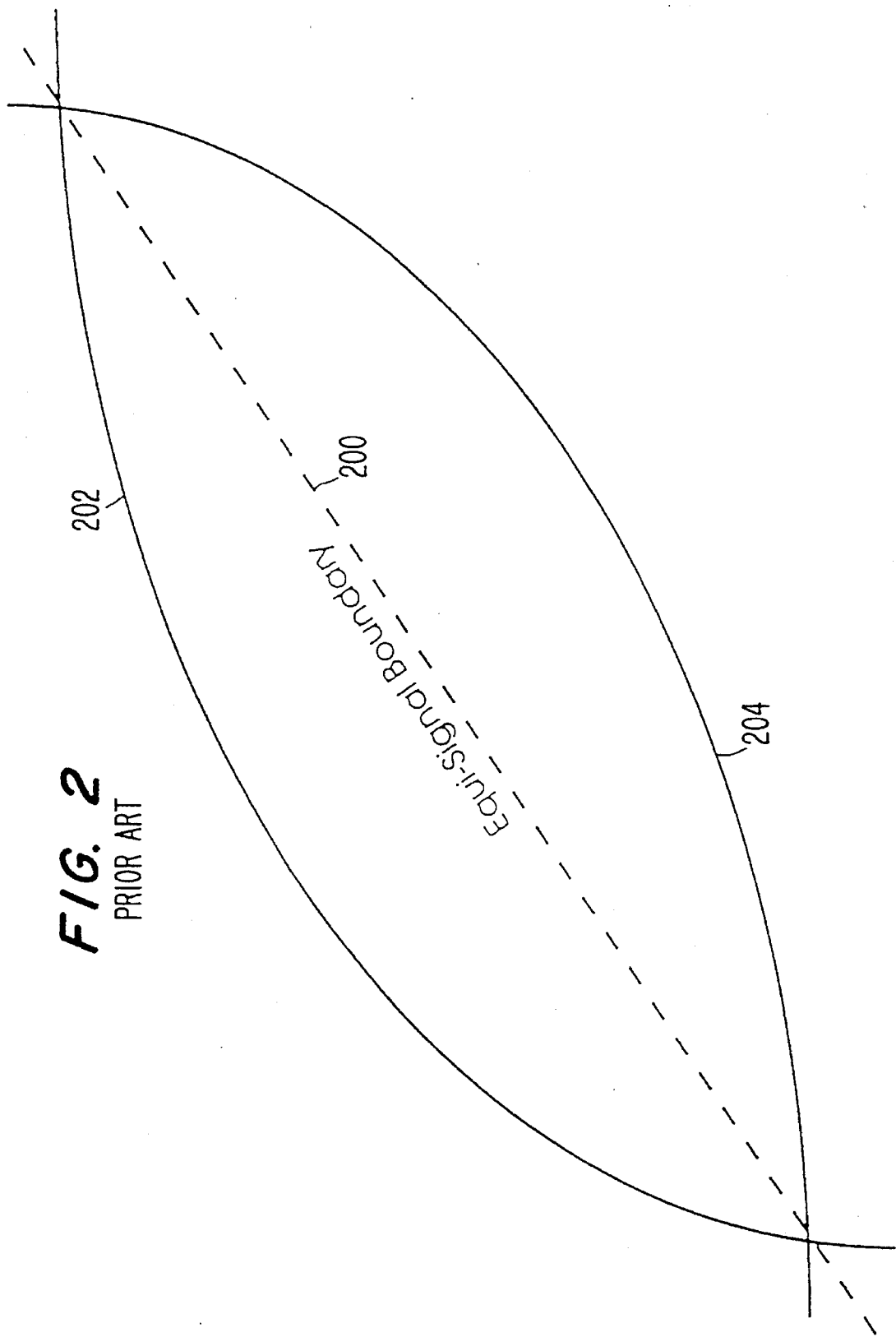
FIG. 2 is a schematic diagram of uniform smooth earth propagation.
Figure 3:
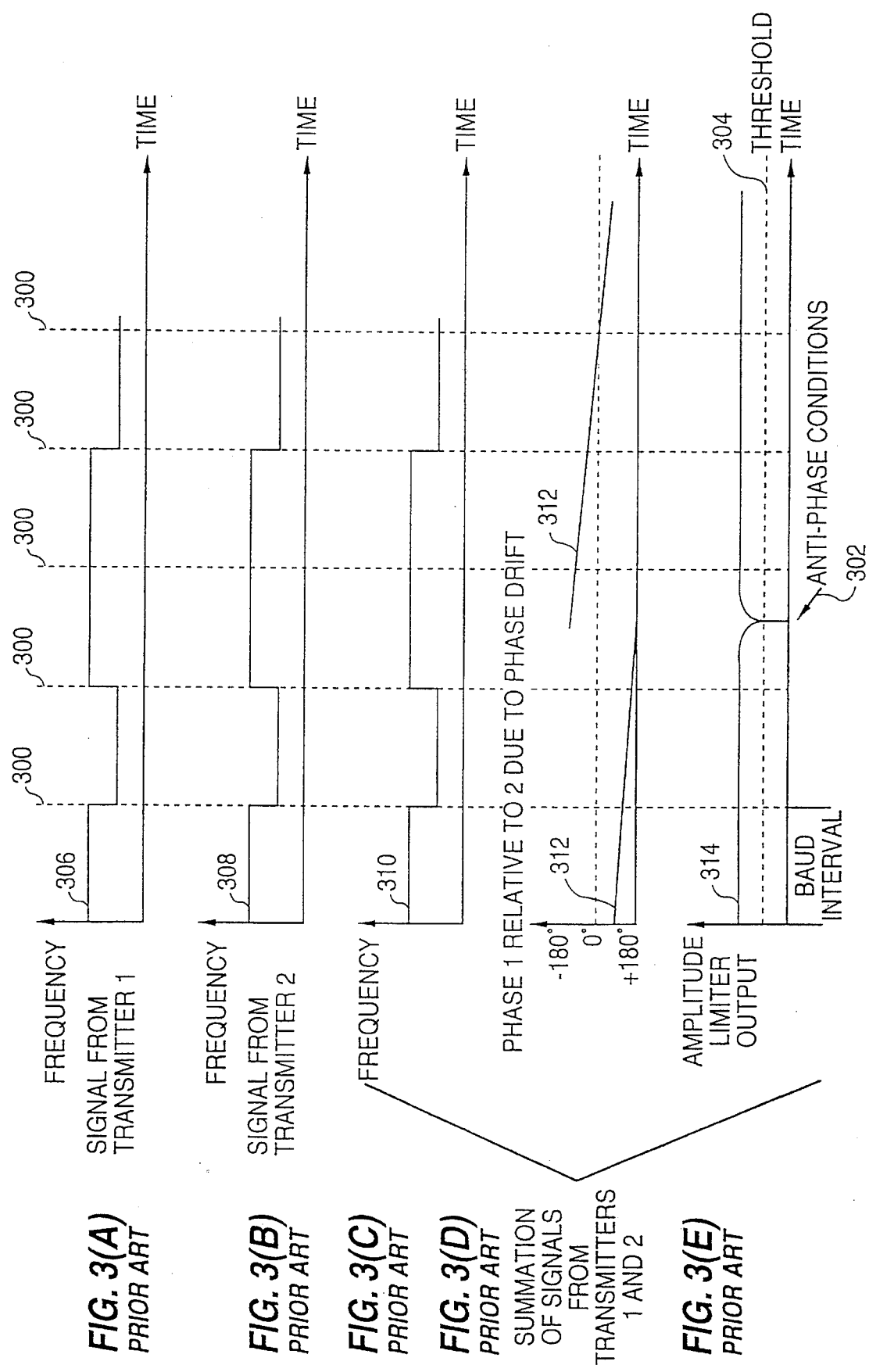
FIG. 3 is a schematic diagram of synchronized modulated waveforms.
Figure 4:
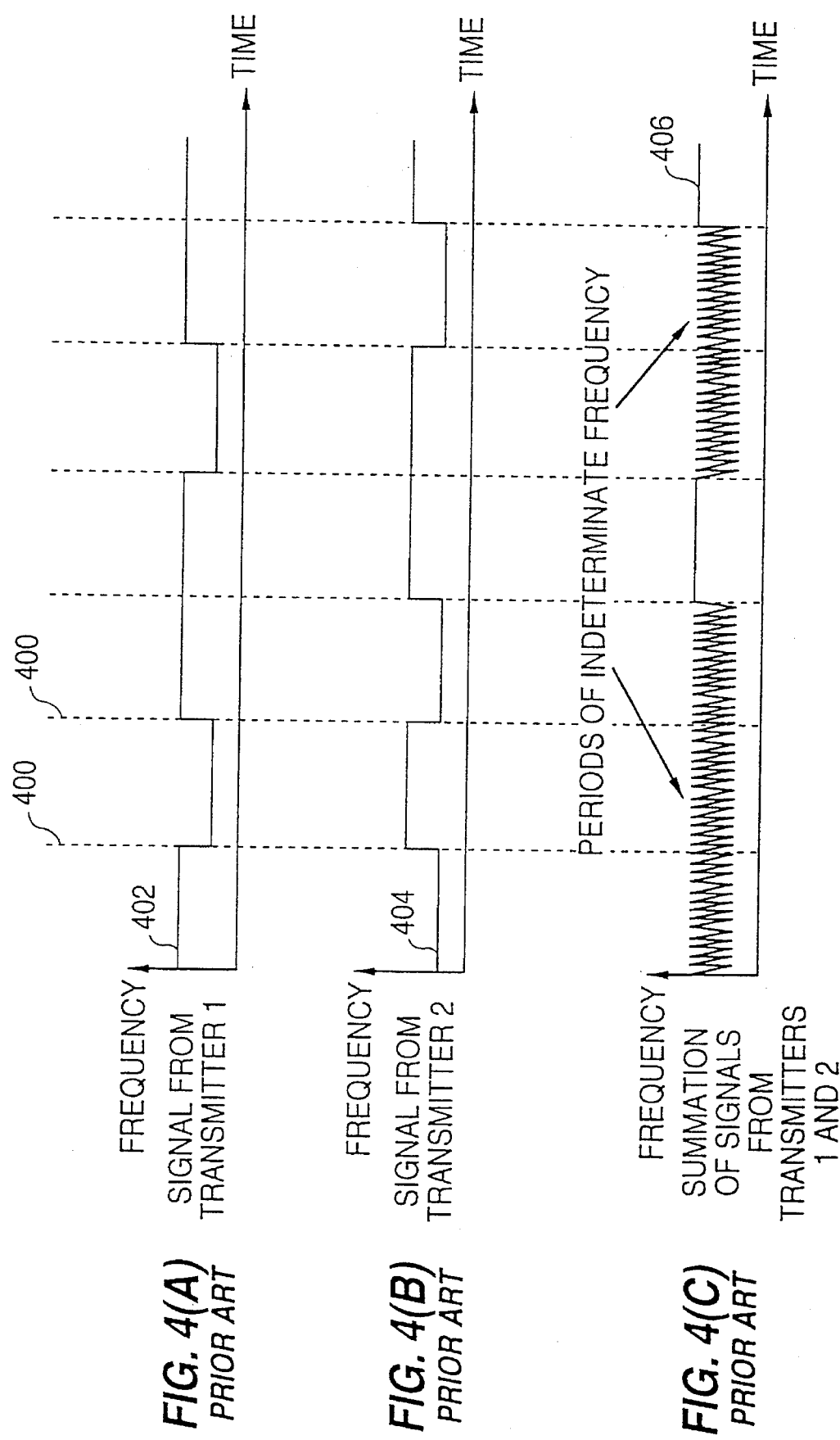
FIG. 4 is a schematic diagram of modulated waveforms offset a full baud.
Figure 5:
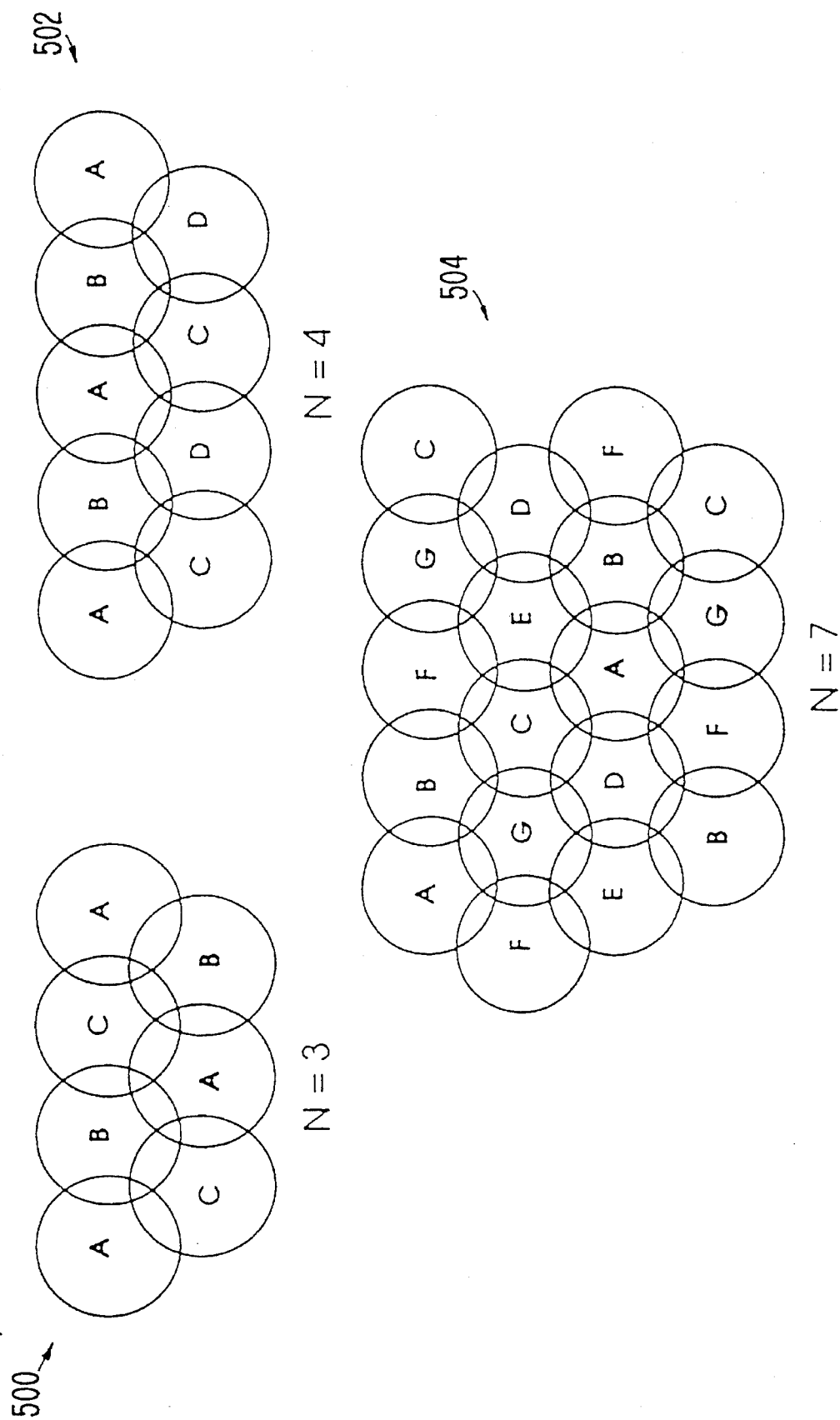
FIG. 5 is a schematic diagram of cellular system coverage.

Referring back to FIG. 2, it can be seen that boundary 202 and boundary 204 overlap in an area near the equi-signal 200 and between these boundaries which may be termed an "overlap area." In FIG. 6, dashed line 660 is drawn near the may be defined as the equi-signal boundary between base transmitter 614 and base transmitter 612. Of course, dashed line 660 does not represent the overlap area that may occur between base transmitter 614 and base transmitter 612.

As explained in the Background of the Invention section, if base transmitters 612 and 614 are broadcasting identical signals on the same frequencies in simulcast, good reception by a receiver located near the dashed line 660, and possibly in an overlap area (not shown), can be achieved. Simulcast thus may provide uniform transmitter coverage for the region shown in FIG. 6. However, if base transmitter 612 is broadcasting a first information signal and base transmitter 614 is broadcasting a different, second information signal on identical frequencies simultaneously, it will likely be difficult for a receiver located in the overlap area to receive either the first or the second information signal. In this instance, the overlap area may be referred to as an interference area because a receiver in this area would receive a composite signal, including the first and second information signal, that would likely be unusable.

Figure 7:
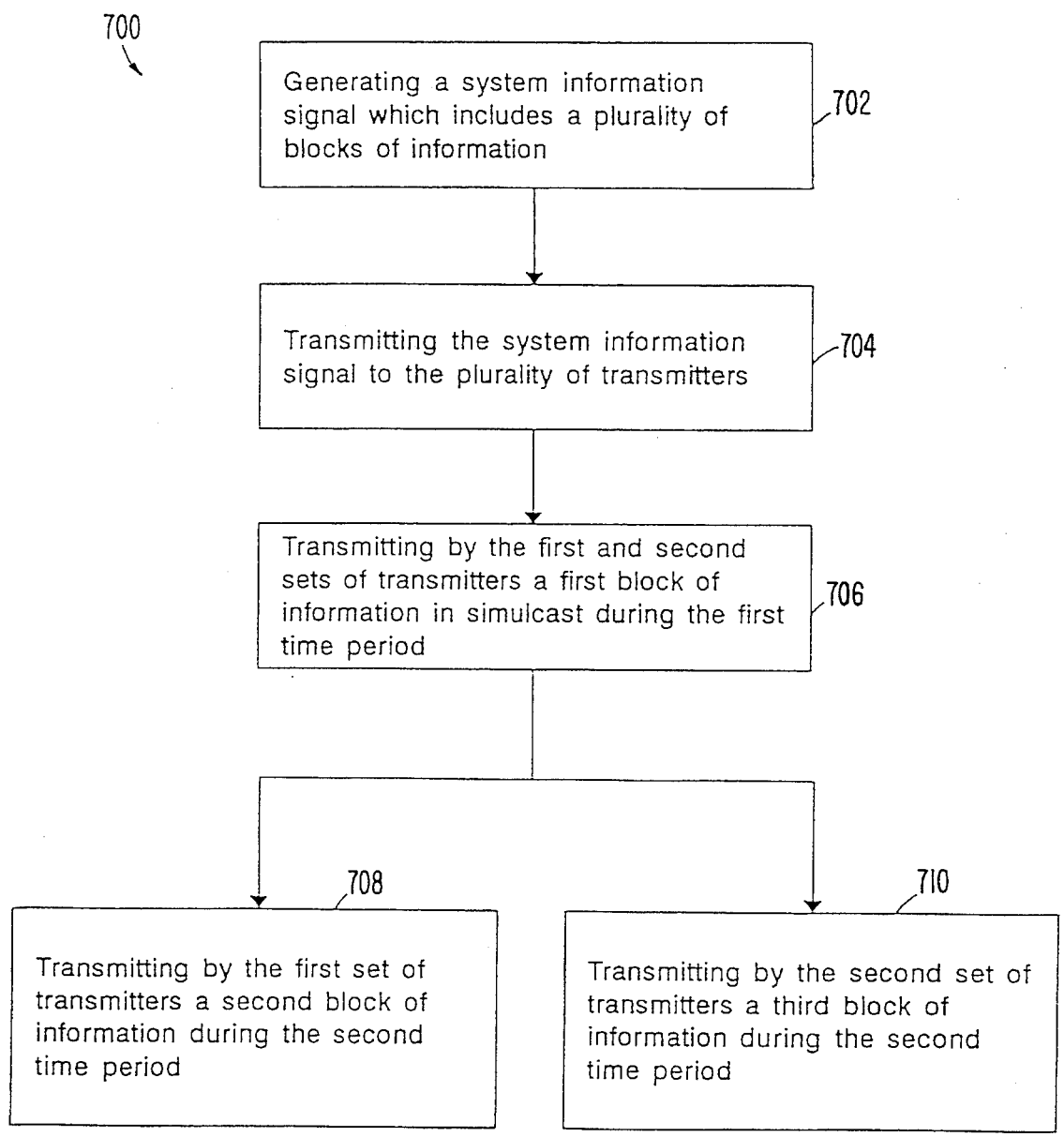
FIG. 7 is a flow chart of a preferred method of communication.

The following will be an exemplary discussion of the various interactions of the elements of the communication system when delivering a message to mobile unit 624. In accordance with the invention, a preferred method 700 of this interaction is shown in FIG. 7. Network operations center 600 generates a system information signal of several blocks of information as shown in step 702. The blocks of information include an electronic message to be delivered to the mobile unit 624.

In step 704, the system information signal is transmitted to the base transmitters. In particular the network operations center 600 provide the system information signal and appropriate other data to the satellite uplink 602 via data path 604 for transmission to the satellite 606. The data is then received and retransmitted by satellite 606 to satellite downlink stations 608 and 610. The data received by satellite downlink 608 is provided to base transmitter 612 through data path 616, and the data received by satellite downlink 610 is provided to base transmitter 614 through data path 618.

At this point, the exemplary communication system shown in FIG. 6 may transfer the message to the mobile unit during one of two time intervals. In the first time interval, both base transmitter 612 and base transmitter 614 transmit data via antenna 620 and antenna 622, respectively, in simulcast to be received by mobile unit 624, which corresponds to step 706 in FIG. 7. This first alternative may be useful to deliver the message if, for example, the location of mobile unit 624 in zone 1 or zone 2 is unknown and broad coverage is desired.

In the second time interval, base transmitter 614 transmits a block of information including the message data to mobile unit 624 and base transmitter 612 transmits another block of information, which corresponds to steps 708 and 710 of FIG. 7. This second alternative may be useful if, for example, the mobile unit 624 is known to be located in zone 1 and out of range of base transmitter 612. Delivery of the message to mobile unit 624 during the second time interval is advantageous because during message delivery to the mobile unit 624 by base transmitter 614, base transmitter 612 could be delivering a different message to a different mobile unit (not shown). As can be seen, this second alternative would increase information throughput and system efficiency.

If the mobile unit 624 has properly received the message via antenna 626, then the mobile unit 624 may generate a return signal and broadcast that signal via antenna 626. The return signal may be received by any or several of the base receivers 628, 630, 632, or 634. For example, the return signal could be received by base receiver 632 through antenna 640 if antenna 640 is located closer to the mobile units than any other antenna 636, 638, or 642. In this case, the base receiver would receive the return signal and provide it to regional station 650 through data path 652. The regional station would then provide the return signal to the network operations center 600 through data path 656 for further processing as appropriate. It should be understood that a return signal may include either an autonomous acknowledgment signal which indicates that the mobile unit accurately received the message or a user generated reply signal.

If the mobile unit 624 does not completely receive the message, it can generate and broadcast a negative acknowledge signal. The negative acknowledge signals when delivered to the network operations center 600, indicates that retransmission of the message is necessary.

It should be understood that the exemplary system shown in FIG. 6 includes a modest number of elements for ease of explanation. It is envisioned that the system of the present invention include a large number of base transmitters, base receivers, regional stations, and mobile units with a substantial number of base transmitters assigned to each zone and all base transmitters assigned to a particular zone operating in simulcast. Further, it is envisioned that the present system could advantageously support a large number of zones to cover a wide geographic area.

B. Overview of the Zonal Simulcast Concepts

The preferred systems and methods of the present invention variously use simulcast techniques within individual zones and over several or all of the zones. As previously noted, zones are generally defined by the coverage areas of the one or more base transmitters. The network operations center 600 assigns each base transmitter in the system to a zone. For example, in FIG. 6, base transmitter 614 is assigned to zone 1, and the base transmitter 612 is assigned to zone 2 by the network operations center 600. To maximize information throughput, the systems and methods of the present invention dynamically control zonal assignments and the use of simulcast techniques.

In general, the communication system of the present invention operates by repeating a communication cycle to achieve desired information transfer, which is more fully discussed infra. The communication cycle is divided into a systemwide time interval and a zonal time interval. In the systemwide time interval, the base transmitters from at least several zones are operated in simulcast to simultaneously transmit identical information to a large geographic area. It should be understood that the systemwide time merely two or more zones.

Broadly speaking, the communication system need not know the location of a mobile unit to transmit to it during the systemwide time interval. Therefore, the systemwide time interval can be used to send a "probe" signal that requests a particular mobile unit to broadcast an acknowledgment signal to allow the system to determine its approximate location by determining which base receiver receives the acknowledgment signal. Probe signals, thereby, may be used to track the locations of mobile units, or to uncover the location of "lost" mobile units.

In the zonal time interval, each base transmitter assigned to a particular zone transmits identical information in simulcast. However, for mobile units at or near the interference areas between adjacent zones, poor communication to those mobile units is likely during the zonal time interval because transmitters in adjacent zones will be simultaneously transmitting different data on the same, or substantially the same, frequencies. The zonal time interval provides good communication capability for mobile units not located near the zonal boundaries and allows the system to "reuse" identical frequencies in adjacent zones. Furthermore, if zonal boundaries are selected to be located in areas where mobile units are not likely to be located, i.e. unpopulated areas, the likelihood of providing good communication capabilities to a large percentage of mobile units can be increased.

As can be seen, from a system perspective, it is desirable to communicate with the mobile units in the zonal time interval because information throughput is maximized by reusing the transmission frequency band in the several zones. In other words, using the zonal time interval allows communication with a large number of mobile units in a short amount of time. Accordingly, communication during the systemwide time interval should be minimized because message transmission during this interval requires a large amount of system resources be dedicated to that message.

For mobile units located near the boundaries between zones where interference is likely during the zonal time interval, good communication capability can be achieved for these units during the systemwide time interval. In the preferred systems and methods, when a mobile unit fails to acknowledge a message sent during the zonal time interval or provides a negative acknowledgment, the network operations center sends a probe signal during a subsequent systemwide time interval to determine the location of that mobile unit. If the location of the mobile unit indicates that a likely reason for the failure of the mobile unit to receive the message is caused by inter-zonal interference, the network operations center may simply retransmit the message during the systemwide time interval. In other instances, the failure to successfully deliver a message may be simply caused by the mobile unit being located in a weak signal area within a zone. In these instances, the system may retransmit the message during the zonal time interval using an appropriate error correcting code or using a stronger error correcting code.

Alternatively, the network operations center may determine from the probe signal that the mobile unit is simply located in a different zone than the zone that the message was first sent. In this case, the network operations center preferably causes the message to be retransmitted in the appropriate zone without again using a portion of the valuable systemwide time interval.

Figure 8:
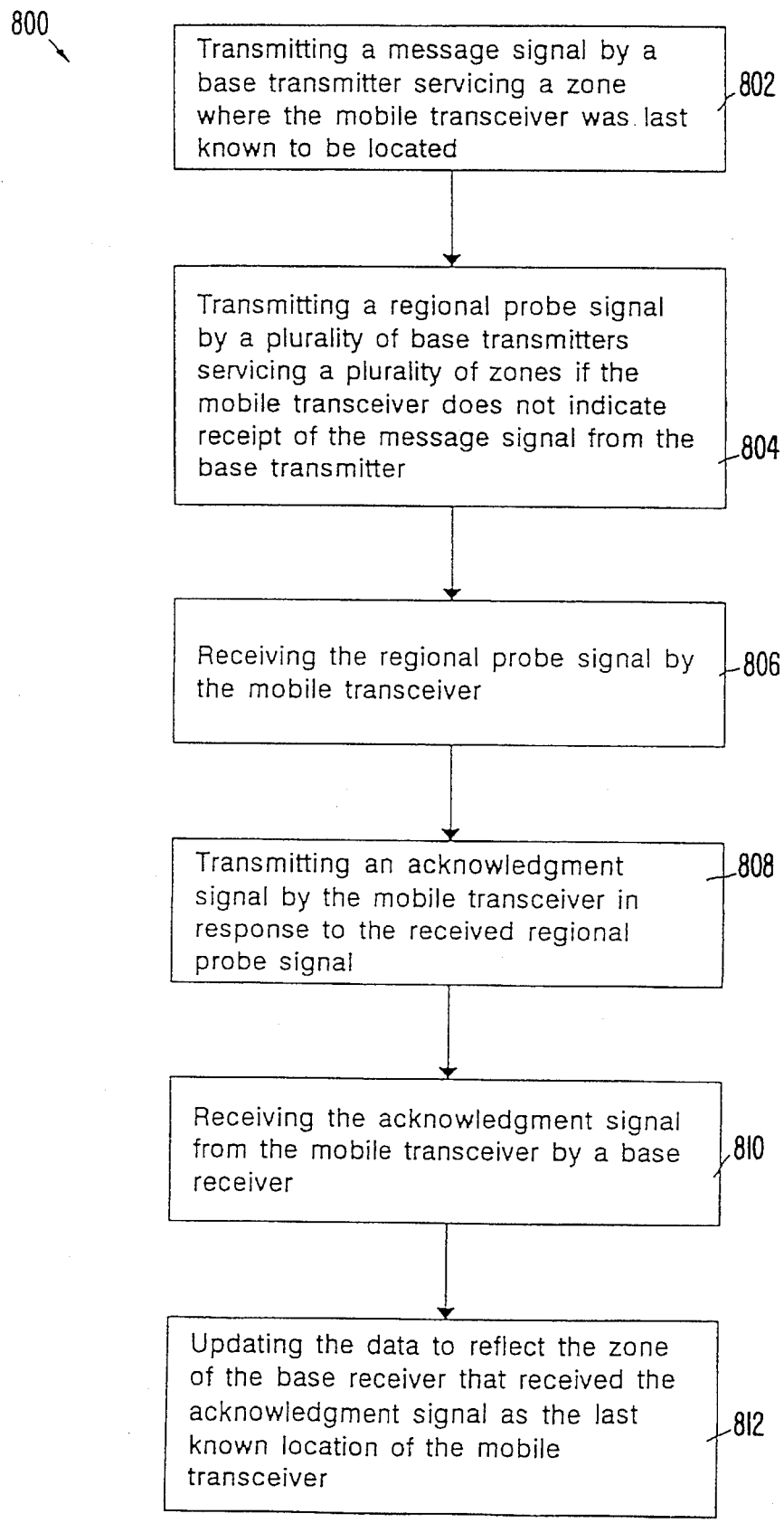
FIG. 8 is a flow chart of a preferred method of sending a regional probe signal.

In accordance with the invention, a preferred method 800 for sending a probe signal is shown in FIG. 8. In step 802, a message signal is transmitted by a base transmitter servicing a zone where the mobile transceiver was last known to be located. In particular, this may be preferably an attempt by the network to deliver a message to the mobile transceiver.

If the mobile transceiver does not indicate receipt of the message signal from the base transmitter transmitted in step 802, the network assumes that the mobile transceiver has not received the message and transmits a probe signal by a plurality of base transmitters servicing a plurality of zones in step 804. The mobile transceiver receives the probe signal in step 806.

Upon receipt of the probe signal by the mobile transceiver, the mobile transceiver transmits an acknowledgment signal in step 808. A base receiver receives the acknowledgment signal from the mobile transceiver in step 810.

Finally, the data, such as the last location field 2104 shown in user database 2100, is updated to reflect the zone of the base receiver, or receivers, that receives the acknowledgment signal as the last known location of the mobile transceiver in step 812.

C. The Multi-Carrier Modulation Transmission Format

The base transmitters of the communication system, such as base transmitters 612 and 614 shown in FIG. 6, preferably utilize a multi-carrier modulation format as will now be described. In general, a multi-carrier modulation format envisions the simultaneous transmission of several closely spaced carrier frequencies within a desired frequency band, each individually modulated to convey an information signal. The multi-carrier modulation format advantageously allows for high data transfer rates by providing good bit rate transmission rates while keeping below the baud rate limitations of simulcast transmission techniques.

Figure 9:
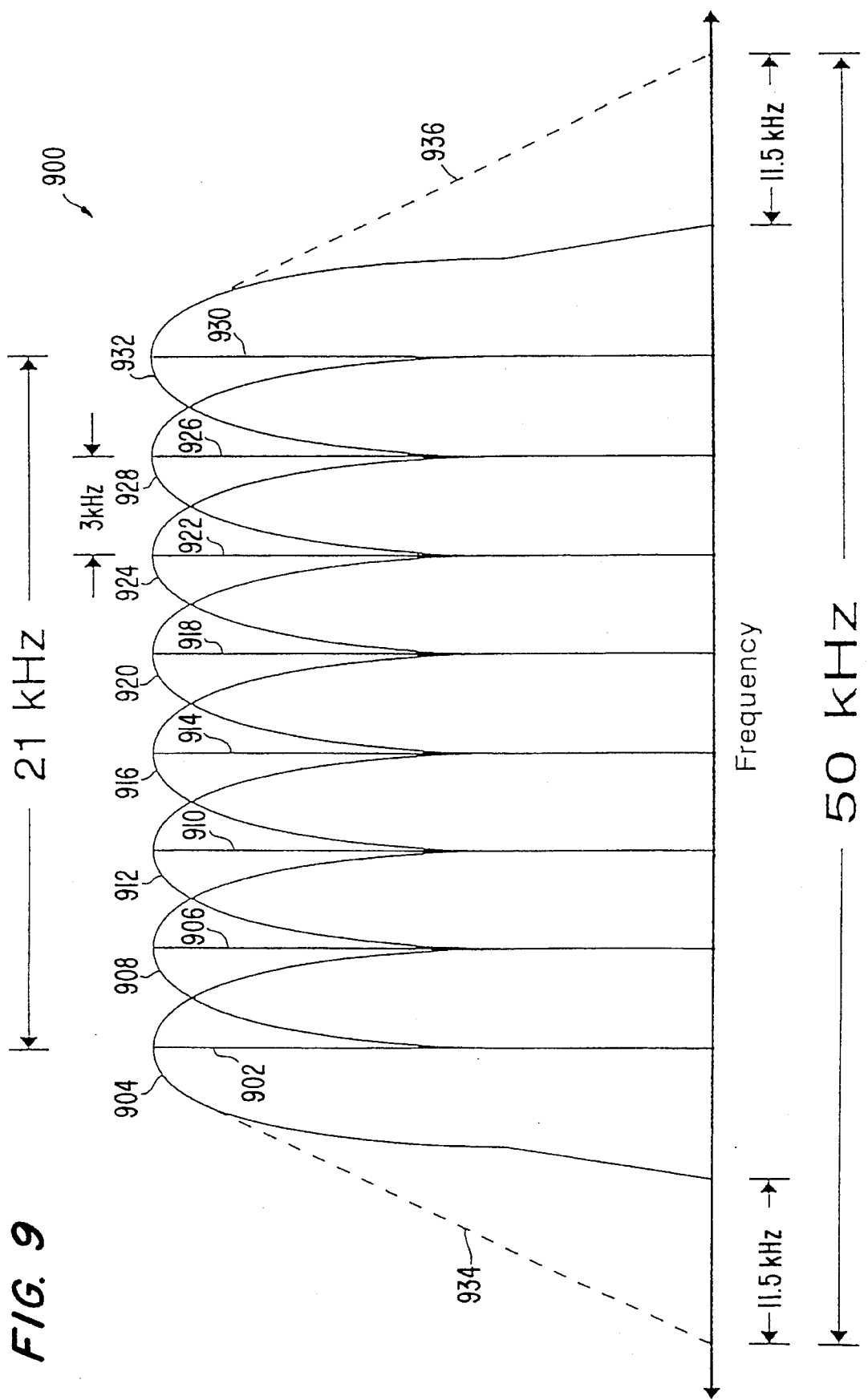
FIG. 9 is a schematic diagram of a frequency spectrum for multi-carrier modulation.

FIG. 9 shows a frequency representation 900 of an eight carrier modulation format. Carrier frequency 902 is shown with side bands 904, carrier frequency 906 is shown with side bands 908, carrier frequency 910 is shown with side bands 912, carrier frequency 914 is shown with side bands 916, carrier frequency 918 is shown with side bands 920, carrier frequency 922 is shown with side bands 924, carrier frequency 926 is shown with side bands 928, and carrier frequency 930 is shown with side bands 932.

It should be understood that although this exemplary figure shows an eight carrier signal modulation format, other different numbers of carrier frequencies may be considered for use in the systems and methods of the present invention.

In this exemplary embodiment, the carrier frequencies are spaced 3 KHz apart within a desired frequency band of 50 KHz. Dashed line skirts 934 and 936 represent minimum frequency roll off levels, such as may be required by Federal Communication Commission regulations, to prevent overlap interference into adjacent frequency bands.

Because eight unique data streams may be modulated onto the respective eight carrier signals in this embodiment, the data transfer rate of the transmission from the base transmitters can be greatly increased, while keeping the baud rate within acceptable ranges for simulcast transmission. It should also be understood that in accordance with good simulcast practice, the respective carrier frequencies between adjacent base transmitters, such as base transmitter 612 and base transmitter 614 in FIG. 6, should be slightly offset to prevent sustained nodes or "dead spots" where destructive interference between the signals from each transmitter provides an unusable composite signal, as was explained in the background section of this application. This frequency offset is preferably on the order of 10–20 hertz.

As previously discussed, each carrier signal may be individually modulated to convey a data stream. The following will discuss alternative techniques for modulating a plurality of carriers in accordance with the systems and methods of the present invention.

1. Modulated On/Off Keying

Figure 10:
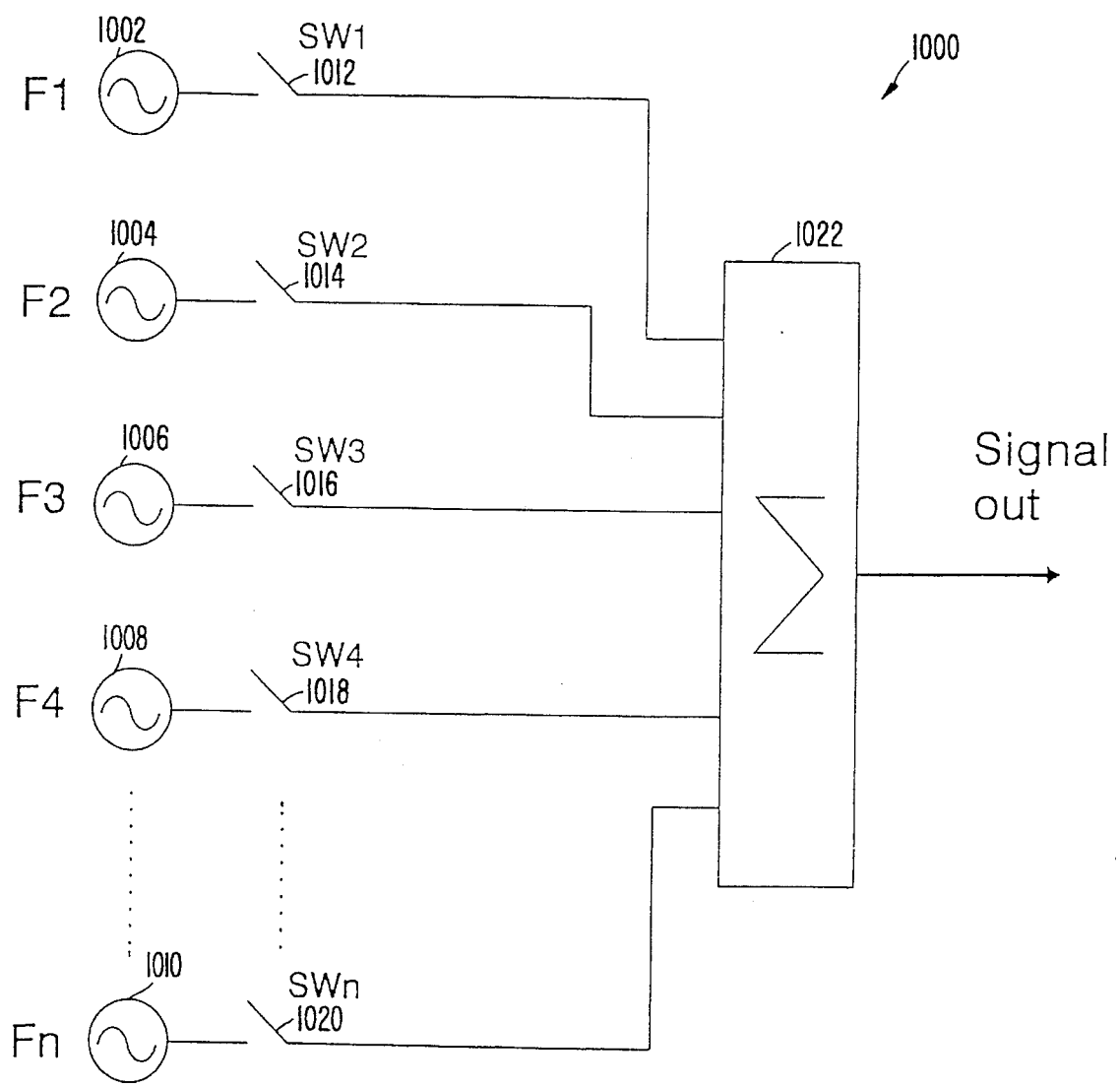
FIG. 10 is a schematic diagram of an on/off keying modulator.

Perhaps the simplest modulation scheme conceptually is modulated on/off keying (MOOK). FIG. 10 shows a schematic representation of a MOOK modulator 1000. The MOOK modulator 1000 includes a plurality of carrier frequency generating devices, such as frequency generator 1002 generating frequency F1, frequency generator 1004 generating frequency F2, frequency generator 1006 generating frequency F3, frequency generator 1008 generating frequency F4, and frequency generator 1010 generating frequency Fn. As shown in FIG. 10, the MOOK modulator 1000 may include any number (i.e. n) of frequency generators, but eight carrier frequencies are preferred, as shown in FIG. 9.

The output from each of the carrier frequency generators 102, 104, 106, 108, and 110 is applied to a plurality of respective switches SW1 812, SW2 814, SW3 816, SW4 818, and SWn 820. The output from each switch is provided to a combiner 1022.

Each of the switches SW1 812, SW2 814, SW3 816, SW4 818, and SWn 820 opens and closes under the control of a control logic system (not shown) to effect the MOOK modulation. The control logic system (not shown) causes the desired switches to variously close and open, thereby conveying an n-bit binary word. Each carrier frequency transmits a binary "one" if the respective switch is closed and a binary "zero" if the respective switch is open.

The summer 1022 combines the modulated carrier frequencies to provide a multi-carrier modulated output signal that conveys an n-bit binary word.

2. Binary Frequency Shift Keying Modulation

Figure 11:
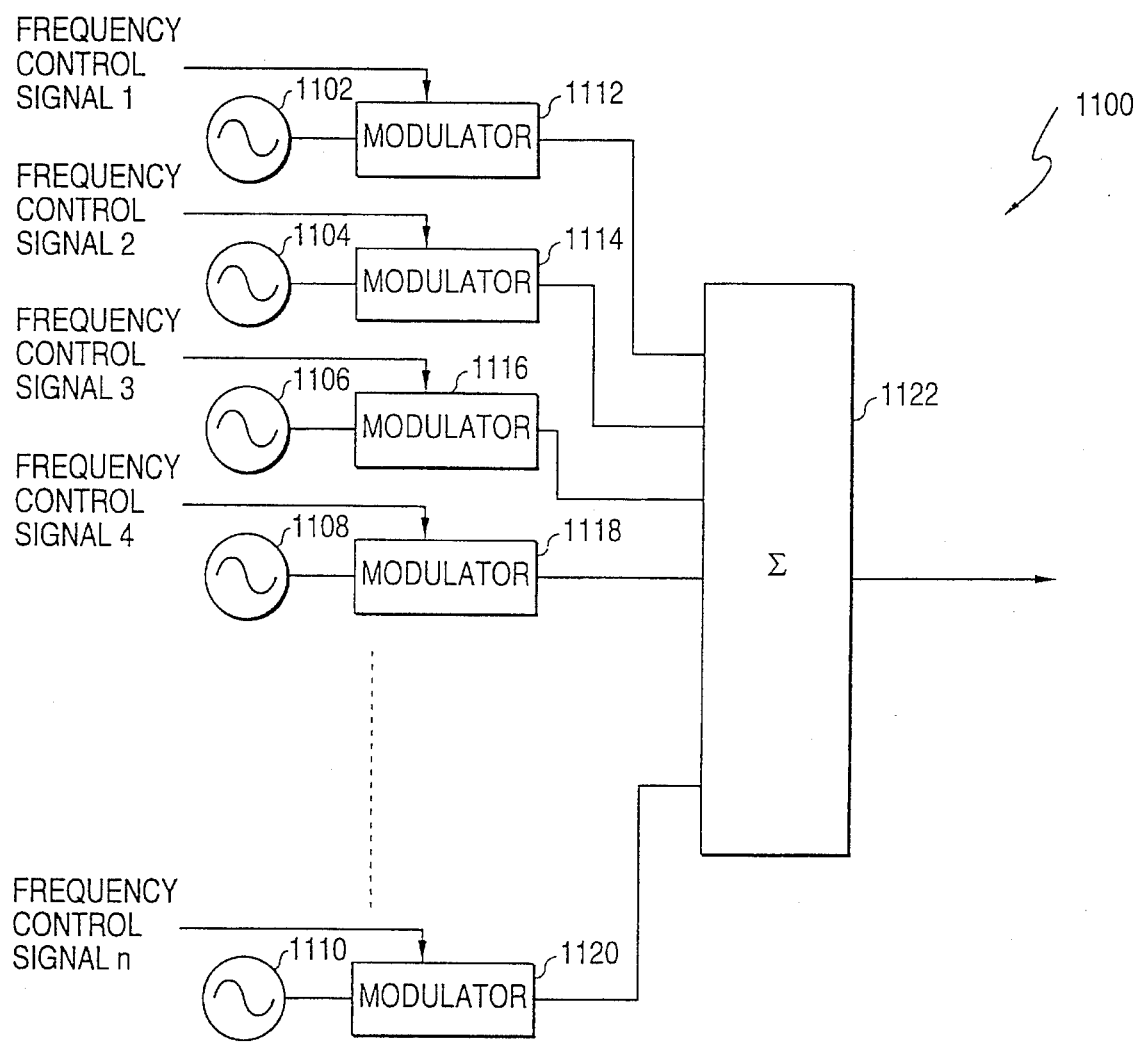
FIG. 11 is a schematic diagram of a frequency shift keying modulator.

An alternative multi-carrier modulation scheme including frequency shift keying (FSK) techniques may be implemented by the modulator shown in FIG. 11. A frequency shift keying modulator 1100 includes a first frequency source 1102, a second frequency source 1104, a third frequency source 1106, a fourth frequency source 1108, and an nth frequency source 1110. The output from each frequency source is provided to a respective modulator 1112, 1114, 1116, 1118, and 1120.

A control logic system (not shown) provides a frequency control signal to each modulator to frequency shift modulate the carrier frequencies. In particular, the control logic system (not shown) provides frequency control signal 1 to modulator 1112, frequency control signal 2 to modulator 1114, frequency control signal 3 to modulator 1116, frequency signal 4 to modulator 1118, and frequency control signal n to modulator 1120. In binary frequency shift keying (BFSK), the respective frequency control signals provide data corresponding to a binary "one" or "zero" which causes the respective modulators to modulate a first or second frequency onto the carrier signal.

A summer 1122 combines the modulated carrier frequencies to produce an output signal.

3. M'ary Frequency Shift Keying Modulation

A modulation scheme related to binary frequency shift keying is M'ary frequency shift keying. M'ary frequency shift keying modulates three or more different frequencies onto the respective carrier signals. In quaternary frequency shift keying, for example, two bits of information may be instantaneously conveyed on a single carrier frequency. Similarly, 8'ary frequency shift keying may instantaneously convey three bits of information per carrier frequency.

Referring again to FIG. 11, M'ary frequency shift keying may be implemented by providing modulators 1112, 1114, 1116, 1118, and 1120 with the capability to modulate M different frequencies onto the carrier signal. Accordingly, the various frequency control signals must provide data indicating which of the M frequencies is to be modulated onto the carrier signal. For example, in quaternary frequency shift keying, the frequency control signals must each include two bits of information to indicate which of the four different frequencies are to be modulated onto the carrier frequency.

The summer 1122 combines the modulated carrier frequencies to produce an output signal.

4. Quadrature Amplitude Multi-Carrier Modulation

Figure 12:
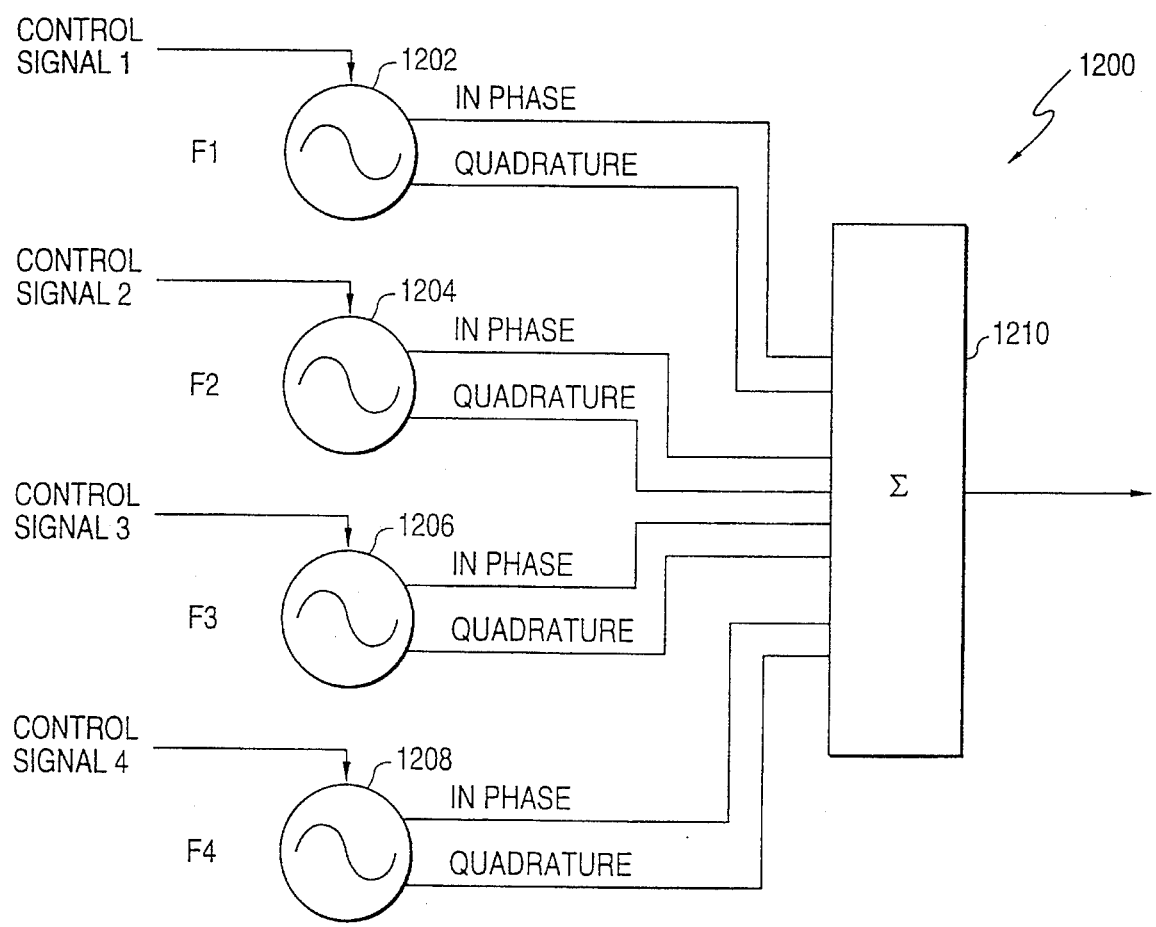
FIG. 12 is a schematic diagram of a four carrier quadrature modulator.

Yet another alternative modulation technique for a multi-carrier transmission format is shown in FIG. 12. A quadrature modulator 1200 includes a first quadrature carrier generator 1202, a second quadrature carrier generator 1204, a third quadrature carrier generator 1206, and a fourth quadrature carrier generator 1208. As is well known, quadrature modulators in general each produce an in-phase carrier signal and a quadrature carrier signal that is ±90° out of phase with reference to the in-phase signal. Of course, any number of quadrature carrier generators could be envisioned, depending upon data transfer and throughput needs. FIG. 12 shows four quadrature carrier generations which effectively correspond to eight unique modulator signals. Therefore, quadrature amplitude multi-carrier modulation may preferably reduce the width of the frequency band necessary to achieve a desired data transfer rate.

Each quadrature carrier generator 1202, 1204, 1206, and 1208 receives a control signal from a control logic system (not shown) which provides the data to be modulated onto the quadrature carrier signals. In a simple implementation, the quadrature carrier generators may amplitude modulate the in-phase and quadrature phase output signals to convey two bits of information. The in-phase and quadrature signals output from each quadrature carrier generators 1202, 1204, 1206, and 1208 are provided to a summer 1210 which combines the signals to produce an output signal.

5. Permutation Frequency Shift Keying (PFSK)

PFSK may be implemented through control logic systems similar to that used in a MOOK or an M'ary FSK modulation scheme. In PFSK, every baud has a fixed number of carrier signals present, preferably any 4 of the possible 8. In a PFSK arrangement, a constant average transmitter power is advantageously delivered and the receiver only need decide which 4 carrier frequencies contain the most energy. In the case of MOOK, the receiver must attempt to determine on a subchannel-by-subchannel basis the presence or absence of a signal. This aspect of PFSK may simplify mobile receiver design.

Compared to a binary or M'ary FSK modulation schemes, a higher number of bits may be delivered per baud with PFSK. For example, PFSK may generate signals that independent FSK subchannels could never generate, such as all four carriers being the four highest frequencies, and therefore it can be seen that PFSK may advantageously increase information transfer rates.

D. The Base Transmitter

Figure 13:
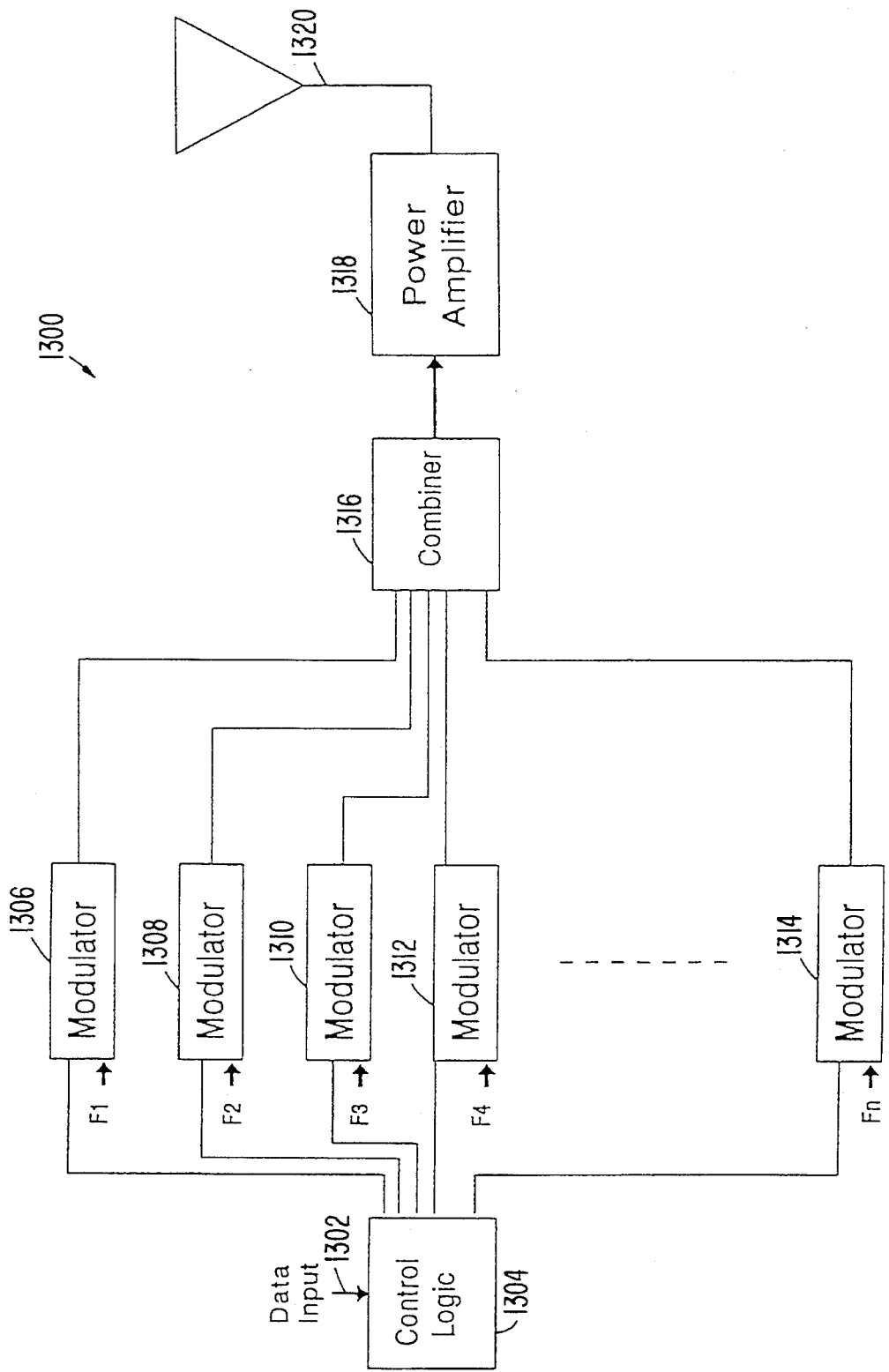
FIG. 13 is a schematic diagram of a first embodiment of a base transmitter.

Each base transmitter unit, such as base transmitter 612 or 614 shown in FIG. 6, receives transmitter control data and message data transmitted from the satellite 606. FIG. 13 shows a first preferred embodiment of a base transmitter 1300 in accordance with the present invention. The base transmitter 1300 receives data from the satellite downlink connected to data input 1302 which provides this data to a control logic system 1304 to control the operation of the base transmitter unit. The control logic 1304 provides a control signal to a plurality of modulators 1306, 1308, 1310, 1312, and 1314. Modulator 1306 produces a carrier signal F1, modulator 1308 produces a carrier signal F2, modulator 1310 produces a carrier signal F3, modulator 1312 produces a carrier signal F4, and modulator 1314 produces a carrier signal Fn.

For example, the control logic may generate appropriate control signals to modulate the carrier signals in a MOOK, BFSK, M'ary FSK, PFSK, or quadrature amplitude modulation scheme, as previously discussed. Each modulator then provides the modulated output signal to a combiner 1316 which combines each of the several modulated carrier frequencies into a single output signal.

The single signal is then applied to a power amplifier 1318 to amplify this signal to an appropriate level. The power amplifier 1318 may, for example, produce a nominal output signal of 350 watts to antenna 1320. In this embodiment, power amplifier 1318 preferably has extremely linear characteristics to prevent formation of intermodulation products, and to insure that these intermodulation products do not cause signals to be generated at undesirable frequencies. Antenna 1320 broadcasts the desired signal from power amplifier 1318.

Figure 14:
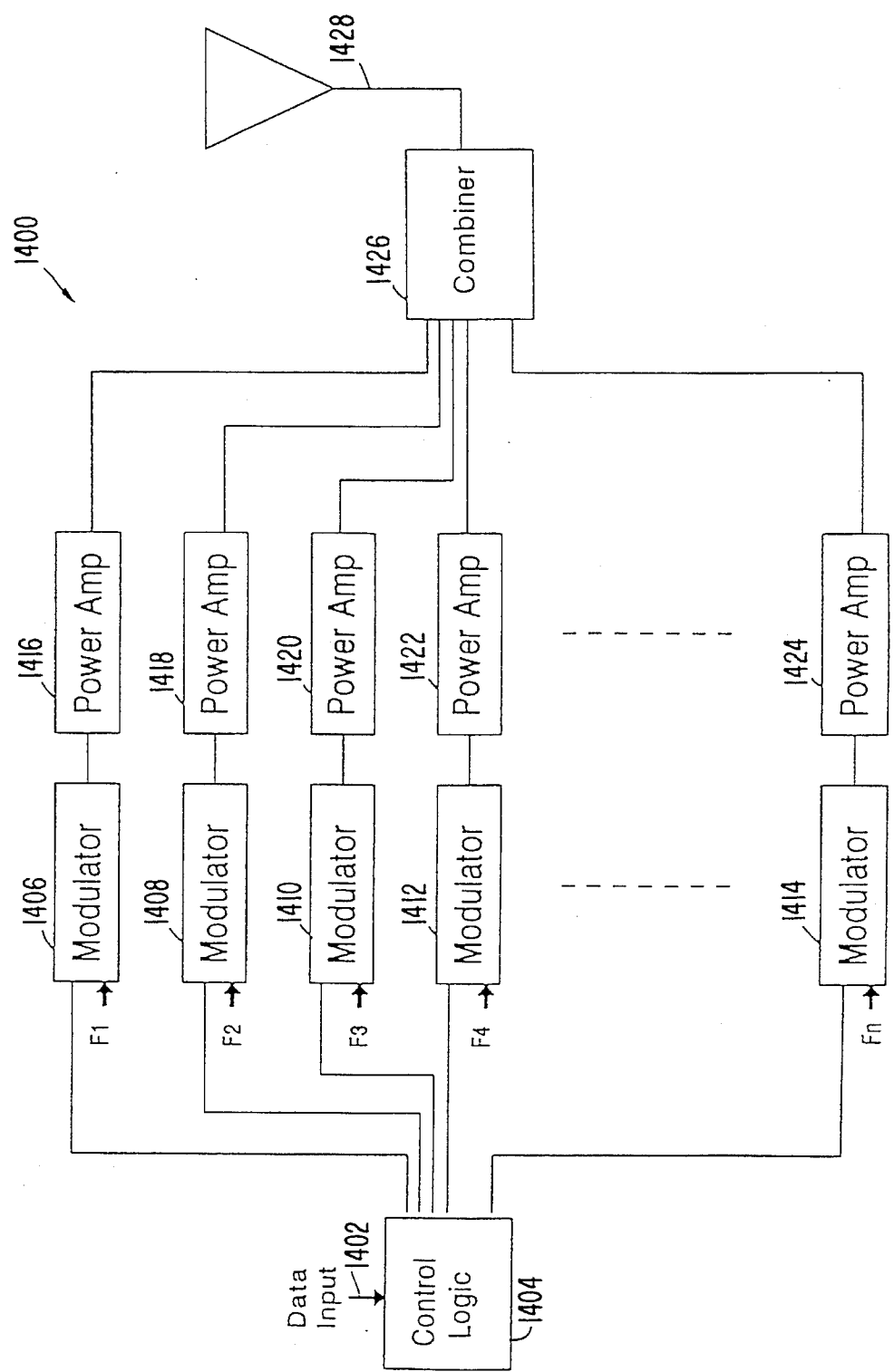
FIG. 14 is a schematic diagram of a second embodiment of a base transmitter.

FIG. 14 shows a second preferred embodiment of a base transmitter unit. The second embodiment comprises a base transmitter 1400 which includes a satellite downlink connected to data input 1402, control logic 1404, and several modulators 1406, 1408, 1410, 1412, and 1414. Each modulator receives an appropriate control signal from the control logic 1404, as previously discussed with respect to base transmitter 1300.

The output from each of modulators 1406, 1408, 1410, 1412, and 1414 in base transmitter 1400 is provided to respective power amplifiers 1416, 1418, 1420, 1422, and 1424 to provide an appropriate power output level for transmission, such as 350 watts aggregate.

The output from each of power amplifiers 1416, 1418, 1420, 1422, and 1424 is provided to combiner 1426 to combine the modulated carrier signals into a single output signal which is provided to antenna 1428 for broadcast.

E. The Mobile Unit

Figure 15:
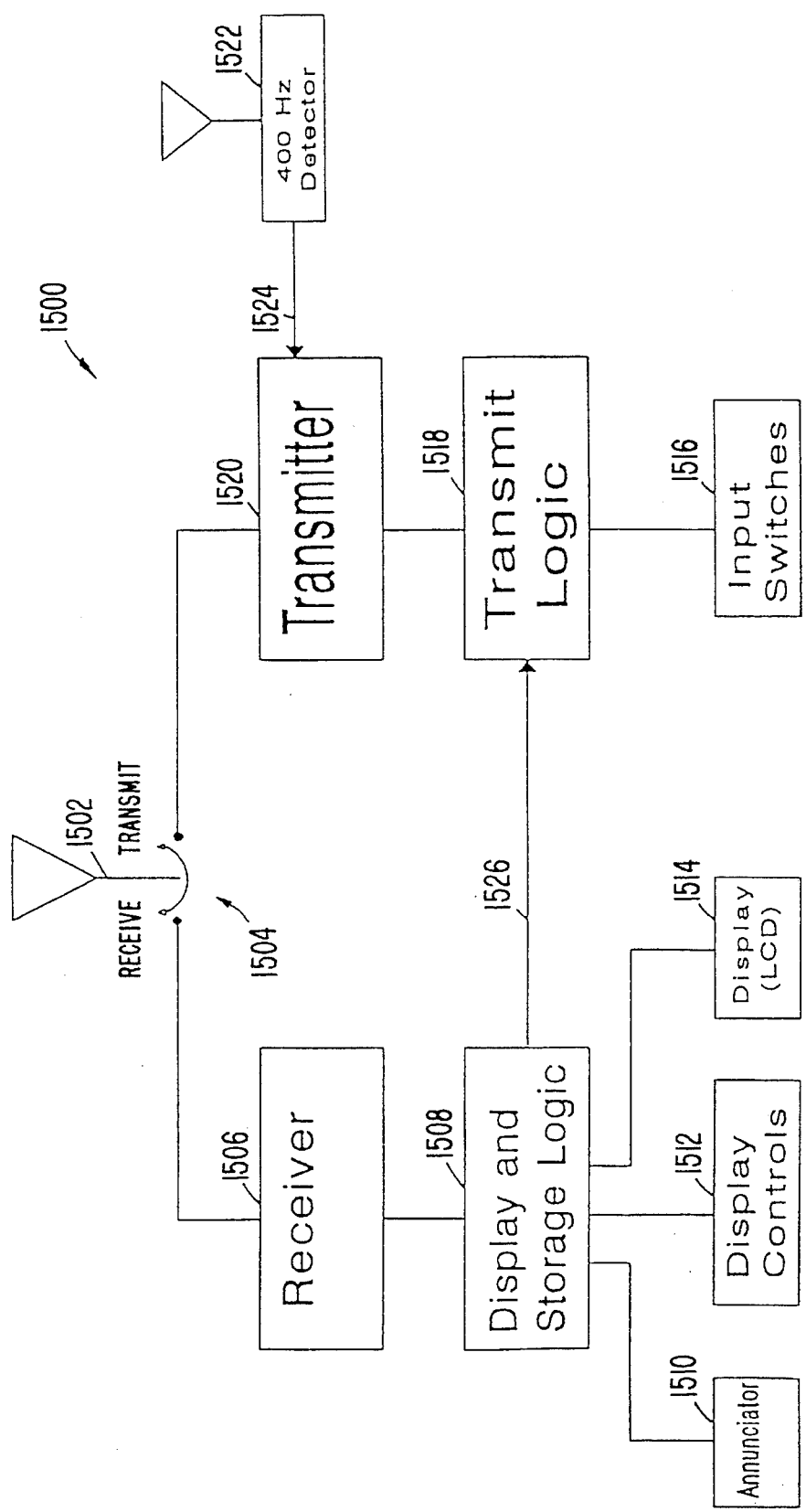
FIG. 15 is a schematic diagram of a mobile transceiver.
Figure 16:
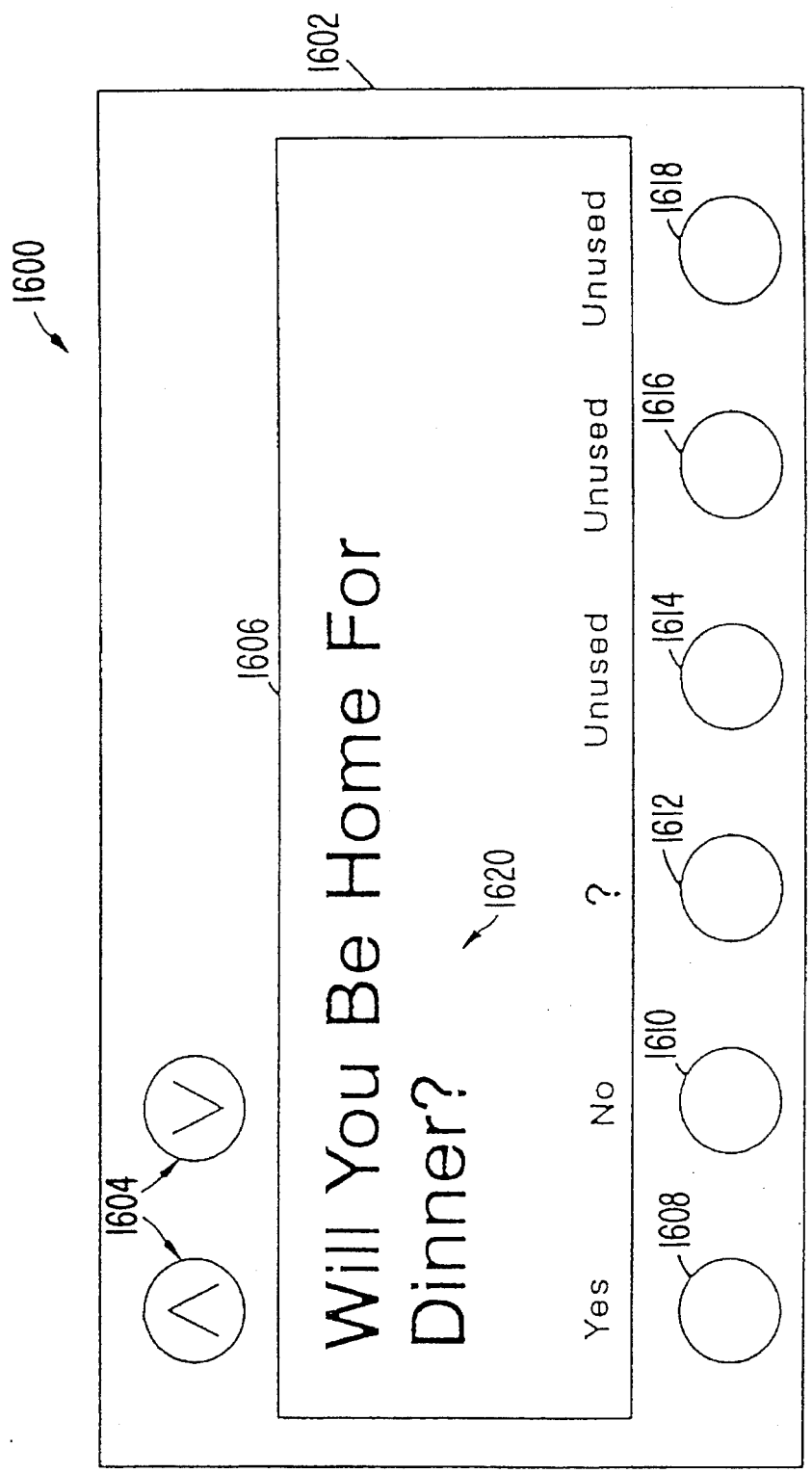
FIG. 16 is a pictorial representation of a mobile transceiver.

The mobile unit may be a small, portable mobile transceiver, such as pictorially represented in FIG. 16. Referring now to FIG. 15, the mobile transceiver 1500 shown therein includes a receiver section for receiving signals from the base transmitters of the system, and a transmitter section for transmitting replies, or other messages, to the base receivers of the system.

In particular, the mobile transceiver 1500 includes an antenna 1502 which is connected to a transmit/receive switch 1504 to switch the antenna between the transmit and receive sections of the mobile transceiver 1500. A receiver 1506 is provided to receive the messages from the base transmitter. Of course, the receiver must be appropriately designed to receive the multi-carrier signals from the base transmitters and must be appropriately designed to demodulate the particular modulation scheme utilized. For example, appropriate analog filters and appropriate demodulators could be used. In the preferred embodiment, the receiver performs a transform, such as a fast fourier transform, on the received signal to separate the data from the various carriers in the multi-carrier modulation format.

The receiver 1506 is connected to a display and storage logic section 1508 to process the received signal. An annunciator 1510 to alert the user that a message has been received is connected to and controlled by the display and storage logic 1508. The annunciator 1510 may commonly include a sound producing device such as a beeper, or a vibrator, or a flashing light.

A set of display controls 1512 to control the display of the mobile transceiver 1500 is connected to the display and storage logic 1508. A display 1514, preferably an LCD display, is also connected to the display and storage logic 1508 to display messages and various other information to the user.

Display and storage logic 1508 is connected to transmit logic 1518 via connection 1526. Display and storage logic 1508 may generate an autonomous acknowledge signal which causes the transmitter 1520 to broadcast an appropriately modulated RF signal. As previously discussed, it is desirable for the mobile transceiver to transmit an acknowledge signal if the message was properly received by the mobile unit, or alternatively to transmit a negative acknowledge signal if the message was only partially received. The negative acknowledge signal indicates that the network operations center should rebroadcast the message to the mobile unit.

Preferably, the rebroadcast of the message to the mobile unit should occur with an appropriate error correcting code which may be decoded by the mobile unit to insure complete and accurate reception of the message. Of course, error correcting codes should be used only when necessary because their use slows data transfer and increases the complexity of the mobile unit. Other types of autonomous replies may also be useful, to indicate to the network operations center that the user has not viewed the message even though the mobile unit properly received it, such as when the mobile transceiver is unattended by the user.

A set of input switches 1516 is provided to allow the user to input a reply to a received message, or to otherwise generate a message to be transmitted by the mobile transceiver. The input switches are connected to transmit logic 1518 which decodes the signal from the input switches 1516 to generate an output signal to the transmitter 1520. The transmitter 1520 generates an appropriately modulated RF signal to be broadcast by antenna 1502.

The mobile transceiver 1500 also preferably includes a noise detector 1522. The noise detector 1522 provides an output signal upon sensing through antenna 1502 a threshold level signal. The noise detector 1522 provides an output signal to disable the transmitter 1520 via connection 1524, and to thereby prevent unwanted transmission by the mobile unit.

Noise detector 1522 preferably is set to detect electromagnetic signals which are generated externally to the communication system and which are indicative of a condition when transmissions by the mobile unit are undesirable. For example, the noise detector 1522 could be designed to serve a threshold level of noise at 400 Hz. When the user enters a commercial aircraft, which commonly uses 400 hertz power supply, the receipt of this noise by the noise detector 1522 would then disable the transmit capability of the mobile transceiver 1500 during operation of the aircraft to prevent any unnecessary or unwanted interference with the operations of the aircraft by autonomous or intentional transmissions by the mobile transceiver 1500.

The display and storage logic 1508 of the mobile transceiver 1500 further preferably includes a timing circuit (not shown) which may be used to turn the receiver section 1506 on or off, as desired. The timing circuit (not shown) advantageously allows the mobile transceiver to "power down" during periods of time when messages are not anticipated to be transmitted. For example, in a preferred communication protocol, the receiver could simply power up at the beginning of each cycle to receive data to determine if a message will be transmitted to that mobile transceiver during that cycle or when information concerning message availability will be transmitted. If the mobile transceiver is to receive a message, the timing circuit could power up at the appropriate time to receive the message, and then power down after receipt. The timing circuit, therefore, advantageously prolongs the battery life of the mobile transceiver 1500. Of course, it should be understood that the timing circuit could control the other elements of the mobile transceiver, such as the display 1514, and the transmit logic 1518.

In an alternate implementation, the receiver 1506 may adaptively change its demodulation techniques to accommodate various formats. For example, each zone may advantageously use a different modulation format depending on message traffic levels, and other considerations. In particular, the receiver may receive a signal indicating the modulation scheme utilized in a given zone via a modulation format message contained in an overhead portion of the data stream. The demodulation of FSK, M'ary FSK, PFSK, and MOOK formats all begin with the determination of the energy levels detected at each of the carrier frequencies, and thus require identical processing of the received RF energy. The logic (not shown) in the receiver interprets the meaning of these measured energy levels based upon the modulation scheme selected as indicated by the received modulation format message. In this manner simpler and more economical transmitters, with a decreased capacity for information transfer, can be used in zones that have decreased traffic loads and more expensive, high-throughput transmitters can be used only in those areas where they are needed.

A pictorial representation of the mobile transceiver is shown in FIG. 16. The mobile transceiver 1600 shown therein includes a case 1602, a pair of display control buttons 1604, a display 1606, and a set of six reply buttons 1608, 1610, 1612, 1614, 1616, and 1618. As indicated previously, display 1606 is preferably an LCD display and a set of display control buttons 1604 may be used to scroll text up or down on the display 1606. The message "will you be home for dinner?" is shown on display 1606.

The set of six reply buttons 1608, 1610, 1612, 1614, 1616, and 1618 provide a flexible system for user generated replies to received messages. The display and storage logic 1508 provides information immediately above each button indicating a possible reply message by the user. In the simple example shown in FIG. 16, the user may reply "yes," "no," or "?" to the message 1620 displayed on the screen 1606. The transmit logic 1518 generates an appropriate signal based upon which button the user presses. In this simple scenario, buttons 1614, 1616, and 1618 are unused.

In alternate applications, up to six possible reply messages may be shown on the screen 1606. Of course, other particularized applications may be envisioned for the reply feature of the mobile transceiver 1500. For example, if the user is a stockbroker, the display 1606 could display the terms "buy," "sell," or "hold" above the appropriate buttons. A variety of other applications may be envisioned.

With the six button reply option provided by mobile transceiver 1500, a three bit message may be transmitted by the mobile transceiver to the base receivers. The two remaining states of the three bit message may be used by the transmit logic 1518 for the autonomous acknowledgment signal which indicates that the message has been properly received, and for the autonomous negative acknowledgment signal which indicates that the message has not been completely or properly received.

Of course, the mobile transceiver 1500 shown in FIG. 16 could be configured differently to provide more or less reply buttons, different display control buttons, and different display formats as desired or needed by the user.

Further, the mobile transceiver 1500 could additionally include a data output port (not shown) for connection to other electronic devices of the user. For example, the mobile transceiver could be connected through an output port to a laptop or palmtop PC, or could be incorporated therein. The PC could display the message on its screen, thereby obviating the need for the display 1606, and the keyboard could be used to generate any appropriate reply messages from the user, thereby obviating need for the reply buttons and allowing free form messages to be sent by the mobile transceiver. A user selected reply would be transferred to the mobile transceiver 1500 from the PC for transmission to the base receiver.

Alternatively, the mobile transceiver could be connected to a voice data replay device, such as a speaker, thereby allowing the user to receive messages from a voice mailbox, for example. Of course, a voice data generation device, such as a microphone, could be connected to the mobile transceiver 1500 to allow the user to reply to the voice mail message he has received or to initiate voice data communication from the mobile transceiver to the base receivers. Similarly, facsimile transmissions could be supported.

An alternate embodiment of the mobile unit includes only receive capabilities, but does not include any transmit capabilities. FIG. 17 shows a mobile receiver 1700. The various components of the mobile receiver generally correspond in functionality to the similar elements shown in FIG. 15. Of course, the mobile receiver 1700 cannot generate replies, which includes user initiated replies, an autonomous acknowledgment signals or negative acknowledgment signals, because of the lack of transmit capability. Also, the location of this alternate embodiment cannot be tracked by the network control center because of the lack of transmit capability. Generally, because of these reasons, the mobile receiver 1700 embodiment of the mobile unit is less preferable than the mobile transceiver embodiment 1500. Further, it should be appreciated that the mobile transceiver embodiment may include circuitry for generating various autonomous responses without interaction by the user.

F. The Base Receiver

The base receivers of the present system receive the low power output signal from the mobile transceiver unit. As is shown in FIG. 6, mobile receivers are dispersed throughout the geographic service area. Base receivers need not be associated with zonal boundaries per se, but will always be located to service at least one zone, of course. A few base receivers may exist in the overlap region between zones.

During transmission of the return signal by the mobile transceiver unit, it is possible that several base receivers could receive this return signal. In this instance, the network operations center 600 preferably selects the data from the base receiver with the highest received signal strength (i.e. the signal with the lowest probability of errors) to maximize the likelihood of receiving accurate data. The signal strength approach is preferred and can be satisfactorily implemented if the base receiver locations are carefully selected to insure adequate signal strength reception from the mobile transceiver units and to minimize the overlap between base receiver coverage areas. Alternately, the network operations center 600 could use "voting" techniques by comparing each data set from the several base receivers to arrive at the most likely return signal data using conventional voting receiver technology.

FIG. 18(A) shows a first embodiment of an analog base receiver. Analog receiver 1802 is connected to an antenna 1800. The analog receiver 1802 simply receives the signal from the antenna 1800 and removes the modulated waveform from the carrier frequency and outputs this waveform in analog format to a regional demodulator 1804 via data path 1806. Data path 1806 is preferably a 4 KHz analog telephone channel.

The regional demodulator 1804 receives signals from several analog receivers included in several base receivers. Preferably, the regional demodulator 1804 is located in the regional station, such as regional station 650 shown in FIG. 6. The demodulated signal from the regional demodulator 1804 is then transferred to the regional processing circuitry 1808, and then onto the network operations center 600.

The analog receiver 1802 could generate identification data to be transmitted with each received message so the network operations center 600 can determine the source of each message received. Alternatively, and preferably, dedicated communication paths are used for each base receiver and therefore, the source of the message can be inferred from the communication path that is activated.

FIG. 18(B) shows a digital base receiver embodiment which includes an antenna 1800 attached to an analog receiver 1802. As in the previously discussed embodiment, the analog receiver 1802 removes the modulated waveform from the carrier signal transmitted by the mobile transceiver unit. The analog receiver 1802 outputs the modulated waveform to a demodulator 1810 included in the base receiver. The demodulator 1810 produces a digital output signal corresponding to the data stream transmitted by the mobile transceiver unit. The demodulator 1810 provides the digital output signal to the regional processing circuitry 1808 in the regional station via data path 1812. Data path 1812 may be any conventional data path which can satisfactorily convey the digital data from the demodulator 1810 to the regional processing center 1808. The regional processing circuitry 1808 then passes the data to the network operations center 600.

Figure 19:
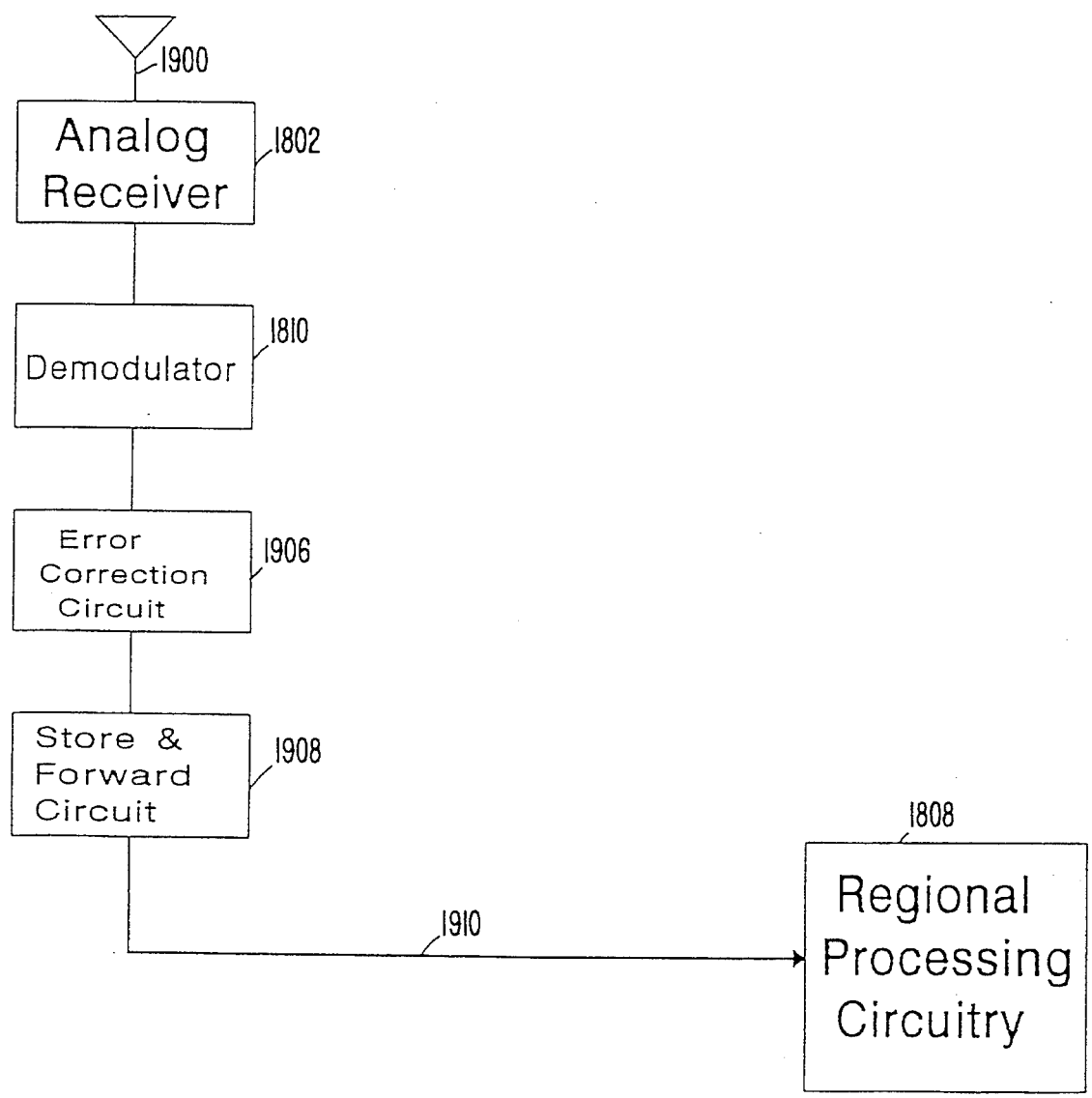
FIG. 19 is a schematic diagram of a base receiver with a store and forward feature.

FIG. 19 shows a digital base receiver including error correction and store and forward features. An antenna 1900 is connected to an analog receiver 1802 which is connected to a demodulator 1810, as previously described with reference to FIG. 18(B). The demodulated digital signal is output from demodulator 1810 to error correction circuitry 1906 which may perform error correction algorithms to insure the integrity of the return signal received from the mobile transceiver unit. Of course, the error correction circuitry should decode and correct data which have been compatibly encoded by the mobile transceiver.

The error corrected data output from the error correction circuitry 1906 is provided to a store and forward circuit 1908. The store and forward circuit 1908 stores the received data to allow it to be transmitted later at a convenient time and at a convenient data transmission rate.

For example, in the present system it is likely that the return signal traffic received by the base receiver will occur in short bursts at a relatively high data transfer rate. However, it is also likely that the average data transfer rate from the base receivers is substantially lower than the instantaneous data transfer rate during traffic bursts. The store and forward circuit 1908 may preferably act as a buffer to allow the return signal data to be communicated from the store and forward circuit 1908 to the regional processing circuitry 1808 at a lower (and less expensive) data transfer rate. Store and forward circuit 1908 is, therefore, preferably connected to regional processing circuitry 1808 via data path 1910 which may include a low cost telephone line.

G. The Network Operations Center

1. Overview

Figure 20:
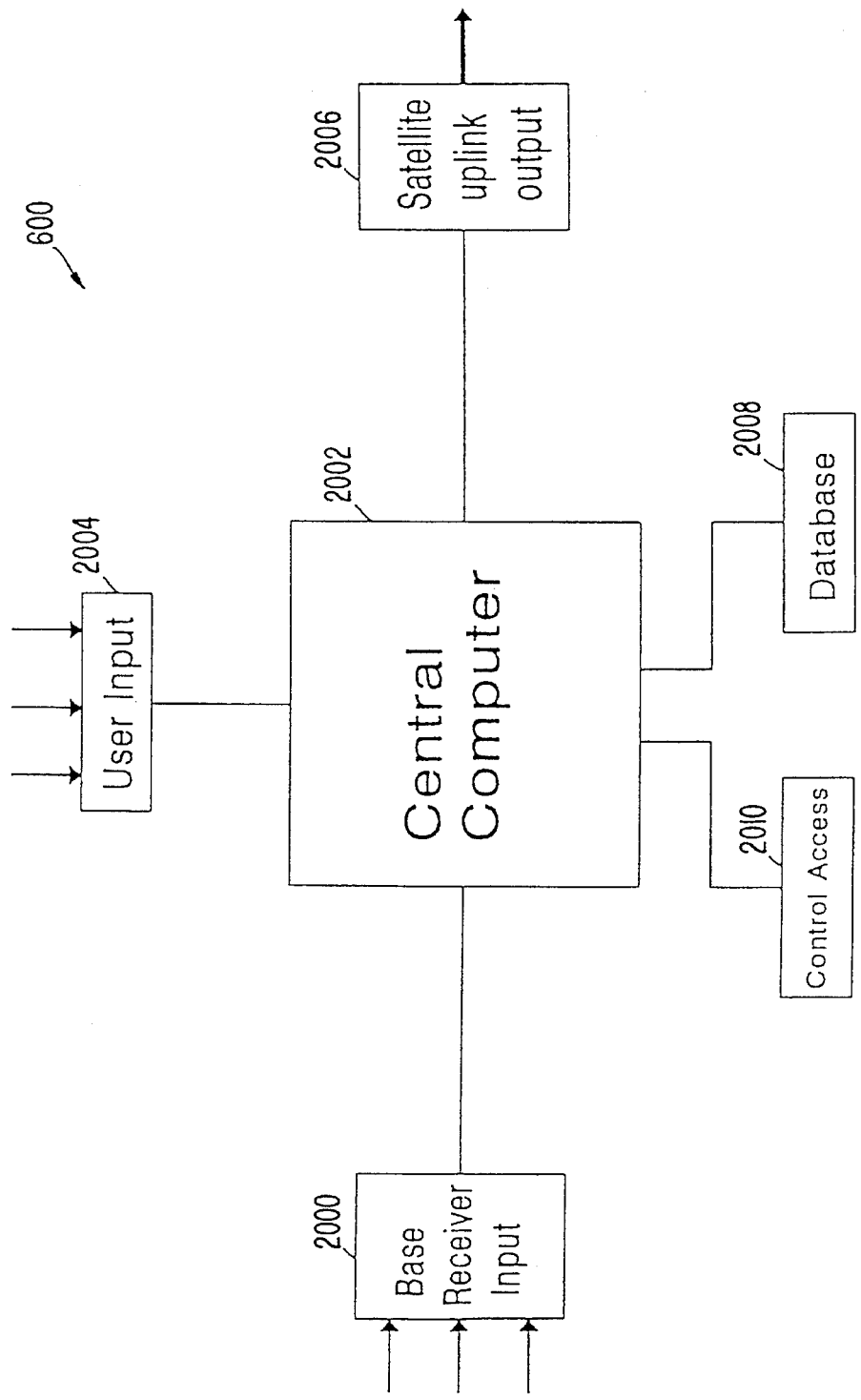
FIG. 20 is a schematic diagram of a network operations center.

The network operations center 600 is shown in schematic form in FIG. 20. The network operations center 600 includes a base receiver input system 2000 which receives data from the various regional stations throughout the system (e.g., regional stations 644 and 650) via various data paths, such as data paths 656 and 658 as shown in FIG. 6. The data received by the base receiver input system 2000 includes reply data from users with various control data. Base receiver input system 2000 may include appropriate conventional signal processing equipment. Control data may include data identifying the base receiver (i.e. location of the mobile unit) which received the associated reply. Preferably, the base receiver input section 2000 receives data from the regional stations via phone lines. However, other appropriate data paths may be considered.

The base receiver input system 2000 then provides the received data to a central computer 2002. The central computer 2002 may also receive input from a user input system 2004. For example, the user input system 2004 may receive data from users via phone lines who may access and interact with the central computer via voice, DTMF, or modem transmission and may include appropriate conventional signal processing equipment. A user may interact with the central computer 2002 to modify his service, to initiate or receive messages, or to perform other desirable functions.

Generally, the central computer 2002 processes the data received from the base receiver input system 2000 and from the user input system 2004 to perform various operations on the data, to update various database entries for use by the central computer 2002, and to generate data for transmission to a satellite uplink output system 2006.

It should be understood that, although FIG. 20 shows the central computer as existing at a single location in the network operations center 600, a distributed computing system may be used to perform the necessary functionality of the central computer 2002. Presently, however, a single location for the central computer 2002 is preferred.

Satellite uplink output system 2006 receives data from the central computer 2002 and provides it to satellite 606, shown in FIG. 6, for transmission to base transmitters within the system (e.g., base transmitters 612 and 614 in FIG. 6).

The central computer 2002 is also connected to a database system 2008 which stores various data such as message data, user status data, system status data, and message status data, for example, for use by the central computer 2002 in processing.

Also, a control access 2010 is provided to allow systems engineers or programmers to access the central computer 2002 to observe and modify its operations and system performance.

2. Database Structure

The database 2008 of the network operations center includes several database structures necessary for the operation of the system. While a preferred partitioning of these databases is described below, it should be understood that other partitionings could be considered, such as moving the various "user traffic" fields from the traffic statistics database to the user database.

a. The User Database

For example, the user database structure shown in FIG. 21 includes a record for each user of the system who possesses a mobile unit. The record for user 1 2100 includes various fields, such as an ID number field 2102 which indicates a unique number associated with that particular user. The transmit capability field 2106 indicates whether the mobile unit assigned to the user has the capability to transmit. The last location field 2104 includes data which indicates the last known location of the user. The last location field may be updated when the central computer recognizes that a new base receiver has received a return signal from the mobile unit, thereby indicating the mobile unit has moved since the last return signal. Of course, if the mobile unit only includes a mobile receiver without transmit capability, the last location field 2104 cannot be updated and the mobile unit may be given a default location.

The service area field 2108 includes data corresponding to the area in which the user has subscribed to. For example, if a user desires service in geographic areas less than the total system service area, the central computer could use the data in the service area field 2108 to cause only selected base transmitters to attempt to transmit messages to a mobile unit.

The button format field 2110 includes data indicating the format of reply buttons the user may access on the mobile transceiver. Of course, for mobile units with only receive capabilities, the button format field will not be used.

The message field 2112 includes data representing one or more messages which are intended for the user. A receive flag is set when the central computer has received data indicating that the message has been received by the mobile unit via an acknowledgment signal. If the mobile unit does not have transmit capability, the receive flag is set upon transmission of the message by the appropriate base transmitters. The user database structure may include other fields for each user of the communication system of the present invention as needed to provide various desired services.

b. The Receiver Database

Database 2008 of FIG. 20 includes a receiver database (not shown) which includes an entry with several associated fields for each base receiver in the system. A first field for each base receiver preferably includes the total number of mobile units which have last communicated with this receiver. A second field for each base receiver preferably includes a list of base transmitters which may cover all or a portion of the receiver coverage area of that base receiver.

c. Traffic Statistics Database

Database 2008 of FIG. 20 should also include preferably a traffic statistics database as shown in FIG. 22 which includes various fields containing statistics calculated by the central computer 2002 concerning traffic patterns for the system. For example, the traffic database 2200 preferably includes a user field 2202 for data indicating a user of the network. Several fields are preferably associated with the user field 2202. Field 2204 includes data representing the number of probe signals sent by the network to locate the mobile unit associated with the user field 2202. Field 2206 includes data representing the number of registration signals received by the network from the mobile unit associated with the user field 2202. Field 2208 includes data representing the number of messages from the network that have been successfully delivered to the mobile unit associated with the user field 2202. Field 2210 may be used for other traffic related data, such as data indicating the average traffic per cycle, and data indicating a time average (i.e. for the last hour) traffic amount.

Further, the traffic database 2200 could include fields (not shown) for data concerning overall system performance and, in particular, each zone in the network. Such area specific traffic data may be useful in optimizing system performance by allowing intelligent redefinition of zonal boundaries.

d. The Service Queue

Database 2008 of FIG. 20 also includes a service queue 2300 as shown in FIG. 20. The service queue 2300 includes a current messages queue and a probe list queue. The current messages queue includes a system wide list of messages to be delivered by the system. The current messages queue includes, for example, a series of ID number fields 2302, 2304, and 2306 with associated data location fields 2308, 2310, and 2312, respectively. The data location fields 2308, 2310, and 2312 include pointers to the appropriate fields in the user database structure shown in FIG. 21. The ID number fields 2302, 2304, and 2306 include data indicating the ID number of the user to which the message is to be delivered.

In operation, the central computer retrieves the ID number 2302 and data location 2308 from the top of the current messages queue and retrieves the appropriate data from the user database 2100 to process and transmit a message to the user.

The probe list queue includes a ID number fields 2314, 2316, and 2318 and data location fields 2320, 2322, and 2324 similar in form to those in the current messages queue. The probe list queue contains a list of users which the system has previously attempted unsuccessfully to deliver a message to. In other words, the users listed in the probe list are considered to be "lost" by the system. The central computer 2002 then initiates a probe routine for the ID number 2314 and data location 2320 located at the top of the probe list.

After successful execution of the probe routine, the last location field 2304 in the user database structure 2100 will have been updated to provide an accurate last location of the user from the base receiver that received the mobile unit's acknowledgment to the probe signal. After the last location field 2304 has been updated, the message can then be replaced in the current messages queue for delivery to the user via the appropriate base transmitters located near the mobile unit.

Preferably, the network operations center gives priority to the delivery of all messages in the current message queue, and then sends probe signals to the users listed in the probe list queue after delivery has been attempted for all messages in the current message queue. If the message volume in the current message queue remains high for an extended period of time, the network operations center preferably begins to periodically send probe signals to the users listed in the Probe List, even though undelivered messages remain in the current messages queue. For example, in this instance of persistent filled current messages queue, the network operation center preferably transmits three probe signals in every cycle transmitted.

e. Base Transmitter Assignment List

The database 2008 of the network operations center also includes a base transmitter database 2400 as shown in FIG. 24. The base transmitter database 2400 includes a zonal assignment field 2404 for data representing a zone assignment associated with a base transmitter field 2402 in the system. Also, a field 2406 for data representing the base receivers in the transmitter coverage area, and a field 2408 for other data associated with a base transmitter, are associated with base transmitter field 2402. As can be seen in FIG. 24, each base transmitter in the network has a base transmitter field and associated fields as described above.

In normal operating conditions of the system with low amounts of message traffic being transmitted, each base transmitter will remain assigned to its particular zone. However, the systems and methods of the present invention provide for dynamically changing the zonal assignments of various base transmitters to improve information throughput. These dynamic zone allocation concepts dynamically reassign base transmitters to new zones generally based upon the volume of messages transmitted during the systemwide time interval, and more particularly based upon the localized volume of messages to mobile units. In general, dynamic zone allocation may be used to deliver messages to mobile units in overlap areas (i.e. "zonal dithering"), or to balance the volume of message traffic between zones.

Figure 25:
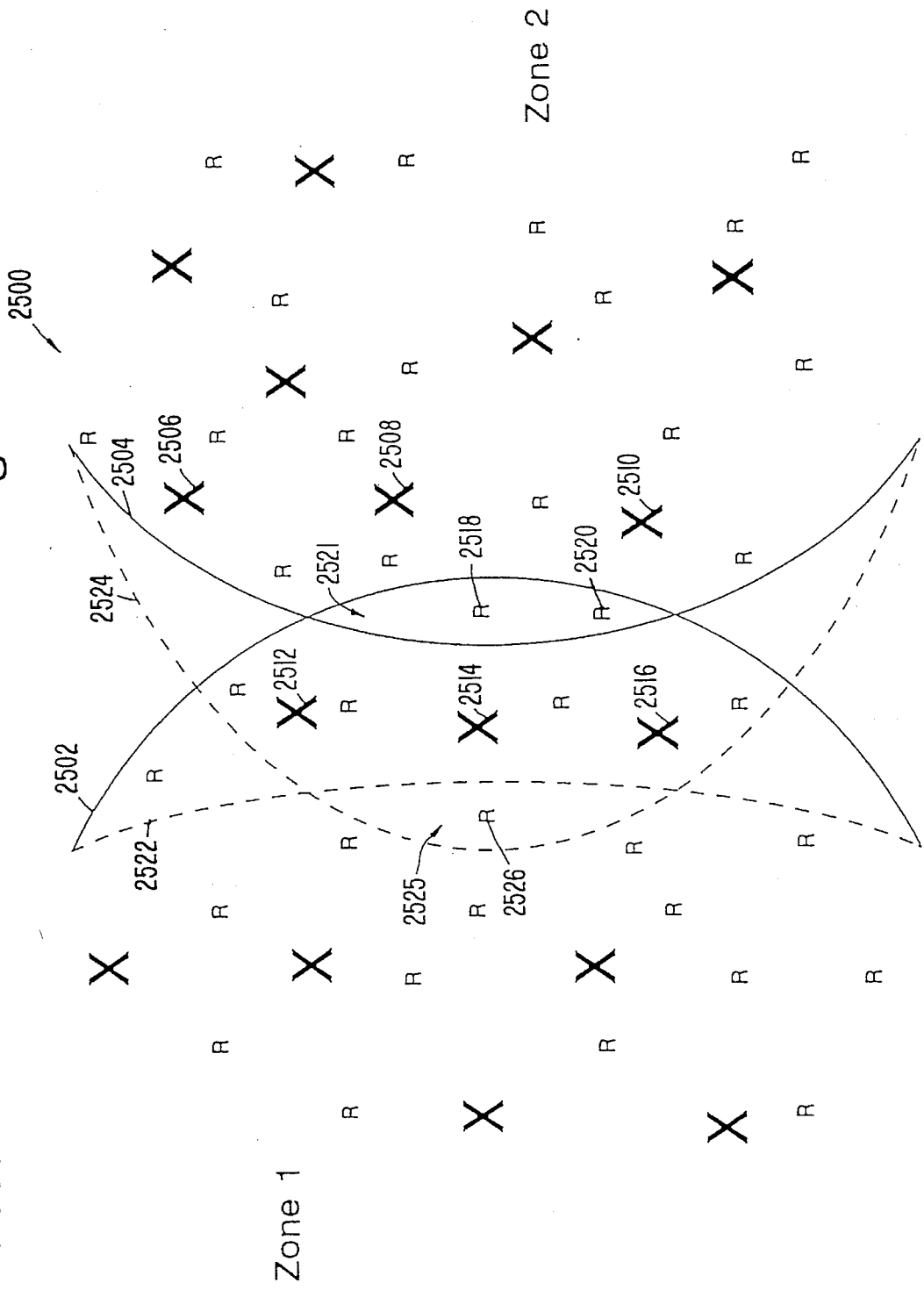
FIG. 25 is a schematic diagram of dynamically changing zonal assignments.

FIG. 25 is useful to explain these concepts. Various base transmitters, each designated as an "X," are dispersed throughout a region of space shown in FIG. 25. Also, various base receivers are dispersed throughout this region of space 2500, each being designated by an "R." The normal zonal boundary for zone 1 in FIG. 25 is shown by solid line 2502. A normal boundary for zone 2 is represented by solid line 2504 during normal load traffic operation conditions. As can be seen, base transmitters 2506, 2508, and 2510 are located near the zonal boundary of zone 2, and base transmitters 2512, 2514, and 2516 are located near the boundary of zone 1. Base receivers 2518 and 2520 are located in an overlap area 2521 between zones 1 and 2. As previously discussed, mobile units located in this overlap area 2521 near base receivers 2518 and 2520 must be communicated with during the systemwide time interval because of the interference created during the zonal time interval by adjacent base transmitters.

During normal, low to moderate volume system operations, the zonal overlap area 2521, i.e., interference area, near base receivers 2518 and 2520 will preferably have a small number of mobile units located therein. Therefore, communication with these mobile units will not significantly consume system resources by occasionally communicating with them during the systemwide time interval.

However, if the traffic volume from the overlap area 2521 near base receivers 2518 and 2520 increases, such as because additional mobile units enter this overlap area 2521, the handling of this traffic in the systemwide time interval can significantly consume system resources. For example, communication with a large number of mobile units during the systemwide time interval may significantly delay delivery of messages to units in this and other regions.

In this instance, the zonal boundaries are changed to remove this high traffic region from a zonal overlap area. For example, system efficiency is restored if the zone 1 boundary were moved to dashed line 2522 and the zone 2 boundary were moved to dashed line 2524.

The central computer 2002 may dynamically accomplish this zonal redefinition by assigning one or more base transmitters to a new zone to reduce systemwide time interval messages. In the present example shown in FIG. 25, the central computer updates the base transmitter zonal assignment list to reassign base transmitters 2512, 2514, and 2516 to zone 2 while removing these base transmitters from zone 1. In view of this zonal redefinition, the new zone 1 boundary is shown by dashed line 2522, and the new zone 2 boundary is shown by dashed line 2524. The high traffic region near base receivers 2518 and 2520 is now squarely within zone 2 and messages to these units may be efficiently delivered during subsequent zonal time interval(s).

Figure 26:
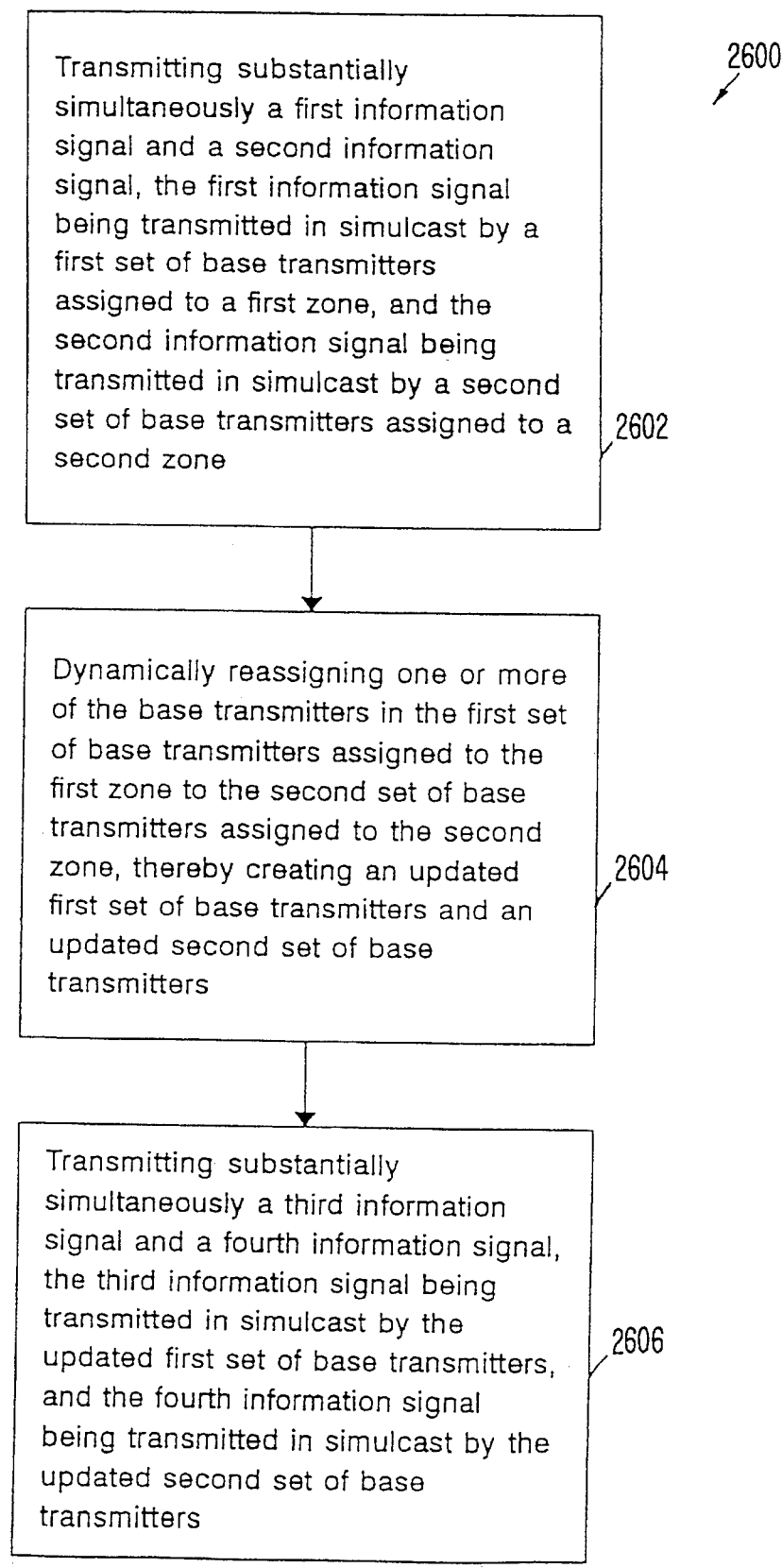
FIG. 26 is a flow chart of a preferred method of dynamically zonal reassignment.

In accordance with the invention, a preferred method 2600 for accomplishing zonal redefinition is shown in FIG. 26. In accordance with the method, step 2602 provides for transmitting substantially simultaneously a first information signal and a second information signal, the first information signal being transmitted in simulcast by a first set of base transmitters assigned to a first zone, and the second information signal being transmitted in simulcast by a second set of base transmitters assigned to a second zone. For example, as shown in FIG. 25, the base transmitters in zone 1 defined by boundary line 2502 could be the first set of base transmitters, and the base transmitters located in zone 2 defined by boundary line 2504 could be the second set of base transmitters.

Step 2604 of the method provides for dynamically reassigning one or more of the base transmitters in the first set of base transmitters assigned to the first zone to the second set of base transmitters assigned to the second zone, thereby creating an updated first set of base transmitters and an updated second set of base transmitters. For example, base transmitters 2512, 2514, and 2516 could be reassigned from zone 1 to zone 2. As shown in FIG. 25, new zonal boundaries would be defined by dashed lines 2512 for zone 1 and 2524 for zone 2.

Step 2606 provides transmitting substantially simultaneously a third information signal and a fourth information signal, the third information signal being transmitted in simulcast by the updated first set of base transmitters and the fourth information signal being transmitted in simulcast by the updated second set of base transmitters. For example, as shown in FIG. 25, the base transmitters assigned to zone 1 defined by dashed line 2522 (i.e. not including base transmitters 2512, 2514, and 2516) could transmit during a subsequent communication cycle a third information signal, and base transmitters in zone 2 defined by dashed line 2524 (i.e. including base transmitters 2512, 2514, and 2516) could transmit a fourth information signal during that same subsequent communication cycle.

Further, it is desirable that during the redefinition of the zonal boundaries, it is insured that the new overlap area 2525 near base receiver 2526 and between dashed lines 2522 and 2524 is an area that is not likely to produce, or is not currently producing a high volume of message traffic. Generally, zonal boundaries should be preferably redefined to maximize information throughput by minimizing the data that must be transferred during the systemwide time interval. A network manager could review the overall traffic patterns and tendencies to determine an optimum redefinition of zonal boundaries. Of course, the central computer 2002 could also implement an algorithm accessing the traffic statistics database 2200 to determine optimal zonal boundary redefinition.

In a preferred embodiment in the instance where an entire region is saturated with mobile units, such as a large metropolitan area repetitive reassignments of base transmitters may be used to reduce message traffics during the systemwide time interval. There may exist no appropriate overlap area, such as overlap area 2525, with a low traffic level to facilitate a long term reassignment of base transmitters with the resulting redefinition of zonal boundaries. In this case, the preferred embodiment alternates between a first and second set of zonal boundaries over each communication cycle and does not attempt to deliver messages during the systemwide time interval.

For example, in FIG. 25 this preferred embodiment would utilize the zonal boundaries defined by lines 2502 and 2504 during a first zonal time interval and would not attempt to deliver messages to mobile units in overlap area 2521. In a subsequent cycle, this preferred embodiment redefines the zonal boundaries to dashed lines 2522 and 2524 and delivers messages to the mobile units in previous overlap area 2521 during the zonal time interval using zone 2 base transmitters. During this cycle, the network would not attempt to deliver messages to mobile units in overlap area 2525. In yet a later cycle, this preferred embodiment would switch back to zonal boundaries 2502 and 2504 which would allow message delivery to mobile units in the now previous overlap area 2525 during the zonal time interval using zone 1 base transmitters. As can be seen, alternating between a first and second set of zonal boundaries advantageously reduces the need for communication during the systemwide time interval, but slows message delivery somewhat by only allowing communication to mobile units in overlap areas during zonal time intervals on alternating communication cycles.

H. The Preferred System Communication Protocol

The system communication protocol is preferably a time division protocol organized within repetitive communication cycles of preferably 30 seconds in duration.

The blocks of data transmitted by the network are preferably formed by a bit interleaving process to prevent loss of data during bursts of interference. Bit interleaving may be envisioned as stacking two or more blocks of data (which read from left to right), and then transmitting a bit stream in a column-by-column, top-to-bottom sequence. As can be seen, a burst of interference will likely only cause the loss of a few bits per word at most, which can be corrected by error correction techniques, rather than the loss of entire words. Of course, the mobile unit must appropriately deinterleave the data prior to processing.

FIG. 27 generally illustrates a variety of preferred time intervals which may variously be used for communication between the system and various sets and subsets of mobile units. An adaptable schedule for these time intervals is preferably generated, and may be revised according to system demands. The scheduling of the time intervals advantageously allows a mobile unit to "power down" during inactive time periods when the mobile unit will not transmit or receive any messages, thereby conserving battery power. Similarly, messages or information for delivery to a subset of the total number of mobile units will preferably be transmitted during time intervals which minimize the delivery of those messages or information to unintended mobile units not included in the subset to further conserve battery power.

A preferred cycle protocol 2700 is shown in FIG. 27(A). The cycle protocol 2700 includes a cycle header time interval 2702, a systemwide forward (FWD) batch time interval 2704, a systemwide response time interval 2706, a zonal forward (FWD) batch time interval 2708, a zonal reverse time interval 2710, and a reverse contention time interval 2712. Other arrangements, such as moving the systemwide reverse interval next to the zonal reverse interval may be considered if transmitter turn on time is significant.

The cycle protocol generally schedules time slots for systemwide and zonal forward channel information transfer from the network to the mobile units and for systemwide and zonal reverse channel information transfer from the mobile transceiver units to the network. Briefly, the cycle header 2702 field includes overhead or "housekeeping" information, the systemwide forward batch field 2704 and the zonal forward batch field 2708 provide forward communication capability through the base transmitters to the mobile units in a systemwide time interval and a zonal time interval, respectively. The systemwide response field 2706 and zonal reverse field 2710 provide a return signal period for the mobile transceivers to respond to messages generated during the systemwide and zonal forward batch periods 2504 and 2508, respectively. Finally, the reverse contention 2712 field allows the mobile transceiver to initiate access to the network.

Each of the fields shown, except the cycle header 2702 field, is preferably variable in duration, and may be changed by the central computer 2002, depending on message traffic requirements. The beginning of the cycle is synchronized by the central computer to a time standard and preferably coincides with the start of minute or half minute intervals. Each mobile unit preferably includes timing circuitry, as previously described, which allows for the mobile unit to power up at the beginning of each cycle to receive communication.

For each cycle, the central computer 2002 calculates the amount of time required for each field to maximize information throughput by the network. For example, for the cycle protocol 2700 shown in FIG. 27(A), the central computer will calculate the amount of time necessary for the systemwide forward batch field 2704, the systemwide response interval 2706, the zonal forward interval 2708, the zonal reverse interval 2710, and the reverse contention interval 2712. The cycle header 2702 will preferably include timing offset data which will indicate the timing offset from the cycle header until the beginning of the systemwide response interval 2706, the beginning of the zonal forward interval 2708, the beginning of the zonal reverse interval 2710, and the beginning of the reverse contention interval 2712.

The cycle header 2702 starts preferably with an 8 digit long preamble (not shown) for digit synchronization purposes. The preamble allows for the mobile unit to synchronize its timing circuitry with the network. For example, the timing circuitry of the mobile unit could become offset from the network due to commonly caused inaccuracies. The preamble is followed by a "start of header" string of four digits and all timing offsets within the cycle are calculated as a number of predefined intervals beginning from the start of the last header digit. The start of header string is followed by an 8 digit string grouped into two words, each of which is protected against errors by encoding it using a forward error correcting code, preferably a Bose, Chaudhuri, and Hocquenghem (BCH) code or a Reed Solomon code. These error correcting codes add additional digits to the information digits in a code word, where the additional digits are a specific function of the information digits, so that if certain common error events occur, a decoding step involving all of the transmitted digits, both information and additional, can recover the original information digits. The first code word will contain a count of the current cycles executed for that day. The second code word will contain the necessary timing offsets for the beginning of the time intervals in the cycle protocol 2700. Further information regarding error correcting codes may be found in Gallagher, "Information Theory and Reliable Communication," Wiley 1968, which is hereby incorporated by reference.

The systemwide forward batch 2704 field generally includes a zonal header time interval including overhead information and a series of 64 batches. Also, the zonal forward interval 2710 similarly includes a zonal header time interval with overhead information and a series of 64 batches. Each batch is a string of data containing information specifically directed to a single group of mobile units. Each batch preferably contains information directed to a certain class of mobile units with the classes divided by the types of service provided. For example, a first batch could be directed to all mobile transceiver units, and a second batch could be directed to all mobile receiver units. Further, each batch may contain several messages, each intended for different mobile units within the particular class of unit to which that batch is directed. Generally, FIG. 27(B) shows the forward batch interval protocol 2750 preferred for both the systemwide forward interval 2704 and the zonal forward interval 2708.

The systemwide forward interval 2704 is preferably used only for sending a probe signal to a mobile transceiver unit which does not respond to zonal messages (i.e. a "lost" unit). However, when necessary, the systemwide forward interval 2704 may be used to deliver messages to mobile units located in overlap areas. The ID number, or address, of the lost mobile unit is preferably followed by data indicating a timing offset which is a time delay amount until the beginning of the time slot designated for the return signal of that mobile unit. An alternative implementation, which may be useful for mobile units that have not responded for a period of time, could have mobile units that have received a probe signal respond during the reverse contention interval.

After the end of the broadcast on the systemwide forward batch time interval 2704, all network base transmitters shut down until the beginning of the zonal forward batch time interval 2708.

The forward batch interval protocol 2750 includes a forward channel header interval 2714 which includes data to allow the timing circuitry of the mobile units to synchronize themselves with the incoming data stream. The forward channel header 2714 also preferably includes data indicating a timing offset scheduling a reverse channel time interval for each batch, as may be required. Of course, the forward channel header 2714 for the systemwide forward interval 2704 would indicate a timing offset for reverse channel transmission during the systemwide response interval 2706, and the forward channel header 2714 for the zonal forward interval 2708 would indicate a timing offset for reverse channel transmission during the zonal reverse interval 2710.

The forward channel header 2714 further includes a data stream to the mobile unit listing which of the 64 batches will follow and the timing offsets indicating when those batches will be transmitted. Again, this feature advantageously allows the mobile unit to "power down" during the systemwide and zonal forward intervals 2704 and 2708 until the appropriate time for receiving its batch information, thereby conserving the battery power of the mobile unit. The remaining fields batch i 2720, batch j 2722, and batch k 2724 are the individual batches directed to the mobile units.

It should be understood that different classes of mobile units can follow different desirable batch protocols, depending on the type of service, processing power, battery capacity, or other factors.

The individual batch protocol 2780 is shown in FIG. 27(C). The batch header field 2726 is similar to the header fields discussed above for FIGS. 27(A) and (B). The batch header 2726 includes a list of particular mobile units to receive messages within the batch and includes timing offsets indicating when such messages will be broadcast. Further, the batch header 2726 includes data indicating a timing offset scheduling a reverse channel interval in the system reverse interval, the zonal reverse interval, or the reverse contention interval, as appropriate. Again, this information allows the mobile unit to extend its battery life because the mobile unit need only power up at the appropriate time to receive or transmit the appropriate message. Further, it is preferred that the reverse channel timing offset data be transmitted using error correction codes to insure accurate receipt thereof by the mobile unit. Accurate receipt of the reverse channel timing offset data will prevent unwanted or untimely transmissions by the mobile unit and insure that a mobile unit may properly transmit a negative acknowledgment signal if it fails to properly receive an unencoded message.

The individual message interval 2732 includes the individual message intended for a particular mobile unit or units. The duration of each message and number of messages within a batch may be varied by the network operations center 600 and is traffic dependent.

Each mobile unit with transmit capability that has received a message in the immediately previous systemwide forward interval 2704 or the zonal forward interval 2708 will have an appropriate time slot for transmission scheduled in the systemwide response interval 2706, or the zonal reverse interval 2710, respectively. The timing circuit in the mobile transceiver unit determines the assigned time slot for transmission. For example, if the mobile unit simply intends to transmit an acknowledgment signal, which indicates that the mobile unit has properly received the message from the network, an 8 bit preamble followed by the address of that mobile unit need only be transmitted and a 3 bit acknowledgment. However, if a more extensive reply from the mobile unit is required, additional data could be transferred during this time slot. In particular, long reverse messages could be scheduled in response to a request from the mobile unit sent during the contention interval 2712, as discussed hereafter.

Due to the low power transmit capability of the mobile transceiver units, there is an increased likelihood of data transmission errors for reply signals. The extended Golay code for error protection may be utilized for reverse channel messages from mobile transceiver units to the network.

The systemwide response interval 2706 and the zonal reverse interval 2710 provide communication capability from the mobile transceiver units to the network (i.e. the reverse channel).

Still further, a preferred embodiment accommodates mobile terminals with extensive reverse message generation capabilities (e.g., a laptop computer connected to a radio transceiver) by allowing for contention messages that request extended reverse channel time for the transmission of a long reverse message. The reverse contention interval 2712 is located after the zonal reverse interval 2710 and provides for unscheduled messages from the mobile unit to the network. For example, the mobile transceiver unit could send a message to the network during the reverse contention interval 2712 indicating that the user no longer wishes to receive messages, thereby terminating service. Also, the user could transmit a message to the network during the reverse contention interval 2712 indicating that the user now desires to reestablish services and begin receiving messages from the network. Further, a "registration signal," which is discussed infra, could be transmitted during the reverse contention interval 2712.

The reverse contention interval preferably utilizes a so-called "slotted ALOHA" protocol, which allows the mobile unit to randomly select a predefined time slot within the contention interval to transmit a message. A mobile station wanting to transmit will first divide the contention interval into slots, preferably 5.33 ms in length, and then choose randomly any of them to start transmitting. The slotted ALOHA protocol is preferred because of the low likelihood of data "collisions" (i.e. 2 or more mobile units transmitting during the same time slot).

I. Registration of the Mobile Unit

Because the network operations center 600 stores the location of each mobile unit in the system in the user database 2100, it is preferred that each mobile transceiver unit have the capability to "register" with the network operations center 600 by sending a registration signal to a base receiver into the network to update the location data.

The mobile transceiver unit preferably registers by simply transmitting its identification number to a base receiver, which forwards this data and data representing the location of the base receiver to the network operations center 600.

The mobile transceiver preferably registers upon crossing zonal boundaries to alert the network operation center that the mobile transceiver has left one zone and entered another. For example, the mobile unit could receive information from the nearest base transmitter identifying which zone that base transmitter is assigned to at the beginning of each communication cycle. Upon receipt of such information from a base transmitter indicating that a nearby base transmitter is assigned to a new zone, the mobile transceiver then preferably transmits a registration signal.

The mobile transceiver unit may also transmit a registration signal in other desirable instances. For example, if the mobile transceiver unit has moved away from the transmitter coverage areas of the network for a period of time, the mobile transceiver unit may preferably transmit a registration signal upon returning to a coverage area. The display and storage logic 1508 of the mobile transceiver unit preferably recognizes that the unit has left the coverage area of the network upon failure to receive data from a base transmitter in the network during the cycle header time interval 2702, for example. The mobile unit may leave the coverage area of a base transmitter of the network when the user takes the unit out of the country, or enters the basement of a building, for example.

The mobile unit may also preferably transmit a registration signal when power is restored to the mobile unit after having power removed, such as after being turned off by the user. Of course, the power may be restored to the unit by replacing or recharging a dead battery, which may also cause transmission of a registration signal.

In general, the network must balance the need for frequent registrations by the mobile transceiver units, and the desirable result of accurately knowing the location of each mobile unit, thereby preventing the need for probe signals, with the undesirable overhead costs of too frequent registration, which sacrifices data throughput by utilizing valuable transmit time.

In the preferred embodiment, the central computer 2002 of the network operations center 600 can achieve desirable performance by implementing one or more algorithms to evaluate the need for registration by a mobile unit, and then appropriately controlling the registration performance of that mobile unit. If the central computer determines that registration of a particular mobile unit is useful, then the mobile unit preferably should receive a message from the network to cause the mobile unit to send registration signals at appropriate times. Conversely, if the central computer determines that the registration signals from the mobile unit are too frequently not useful, the mobile unit preferably should receive a message from the network to cause the mobile unit not to transmit registration signals.

To implement this feature, the mobile transceiver unit further preferably includes a registration flag (not shown) in the display and storage logic section 1508. If the registration flag is set, the display and storage logic section 1508 causes the mobile transceiver to autonomously send a registration signal to the network operations center on a desired basis. If the registration flag is not set, the display and storage logic section 1508 prevents any registration signals from being sent. The registration flag may be set or removed upon command from the network operations center by transmission of an appropriate signal from a base transmitter near the mobile unit. A variety of algorithms, possibly regarding individual users or groups of users, can be used to determine whether or not the registration flag should be set. It should be appreciated that the present invention provides two distinct algorithms for implementing these registration concepts depending upon whether the registration flag is set or not in the mobile unit (i.e. the state of the mobile unit).

Figure 28A:
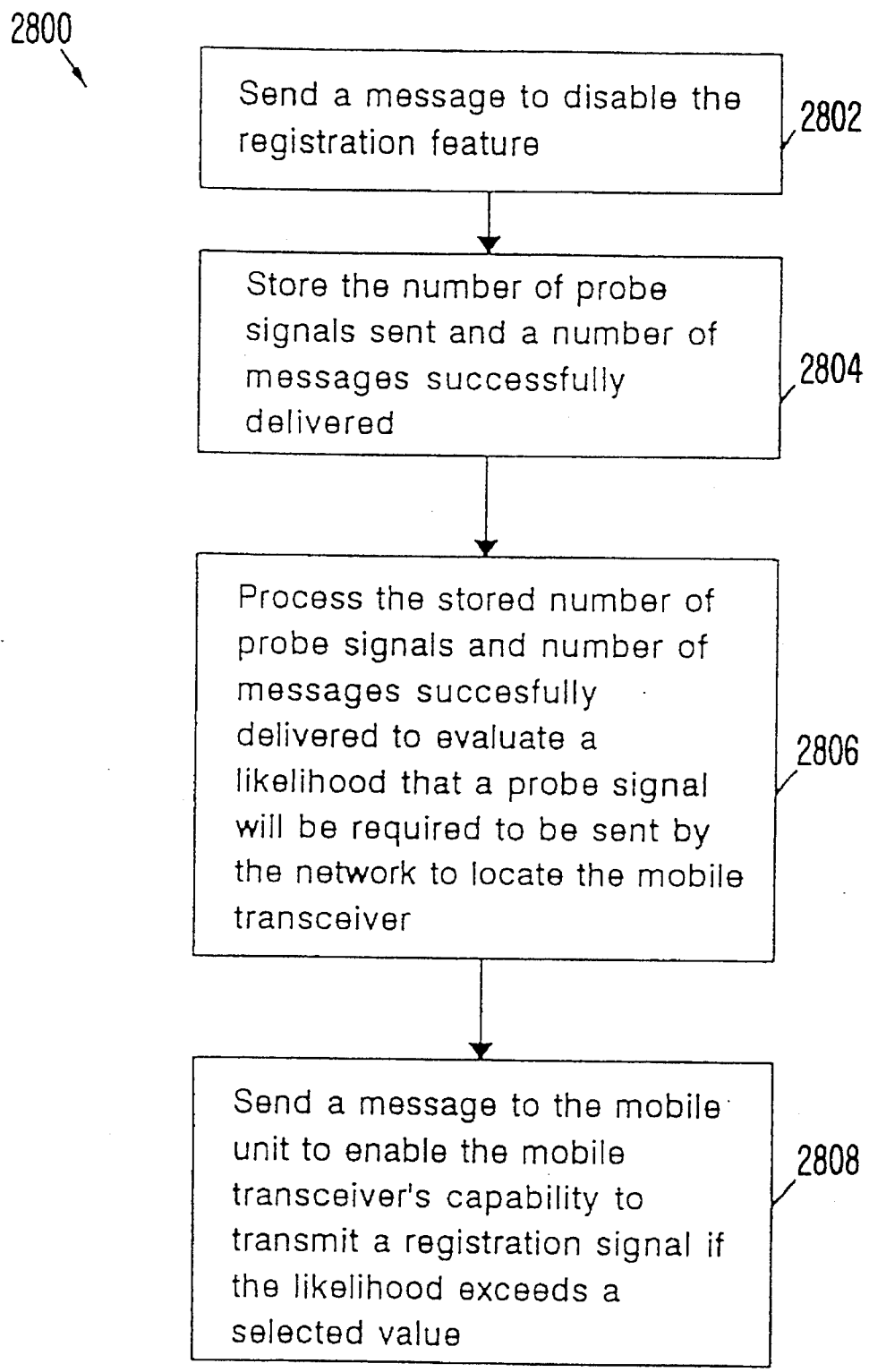
FIG. 28(A) is a flow chart of a preferred method to enable the registration feature of a mobile unit.

FIG. 28(A) shows a flow chart describing a preferred method 2800 for implementing the registration concepts of the present invention wherein the registration feature of the mobile unit is disabled. In step 2802, the network sends a message to disable the registration feature (i.e. set the registration flag to zero) of the mobile unit to disable the mobile transceiver's capability to transmit a registration signal. As can be seen, step 2802 determines the initial state for the method set forth in FIG. 28(A).

In step 2804, the network stores the number of probe signals sent to the mobile transceiver during a first period of time, and the number of messages successfully delivered to the mobile transceiver by the network during a second period of time. Preferably, the first and second time intervals are identical. The traffic statistics database 2200 of the database 2008 is preferably used to store the number of probe signals and successful messages for each mobile unit. As explained hereinafter, these two statistics from the operation of the network are preferably used to determine whether registration by the mobile unit is useful.

In step 2806, the stored number of probe signals and number of messages successfully delivered is processed to evaluate a likelihood that a probe signal will be required to be set by the network to locate the mobile unit to deliver a message. The preferred embodiment of the invention processes the stored number of probe signals and messages successfully delivered in accordance with the method set forth in FIG. 29(A).

Figure 29B:
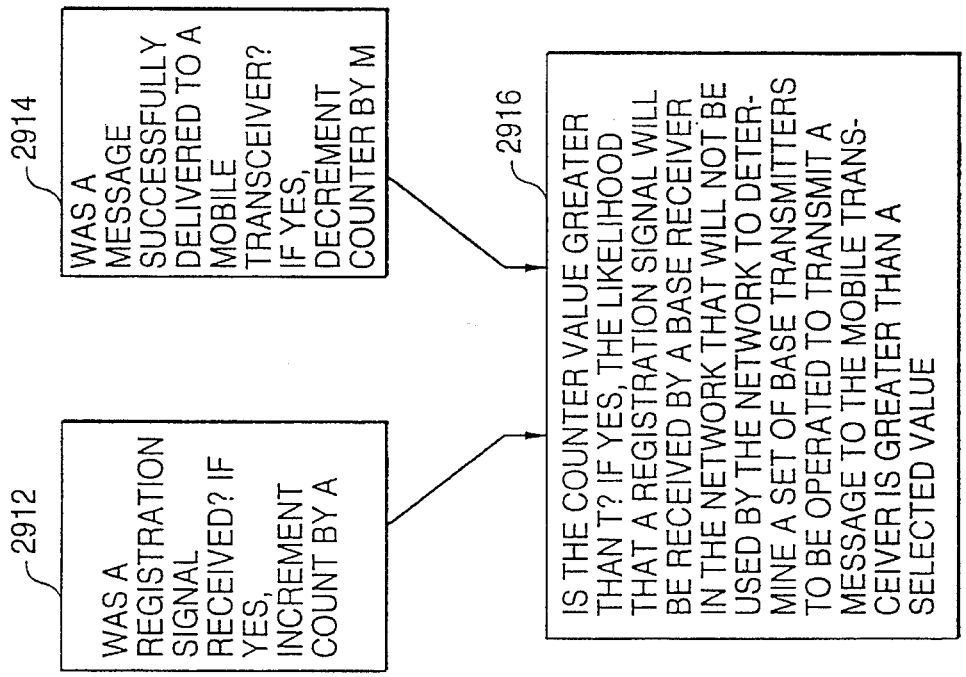
FIG. 29(B) is a flow chart of a preferred method used to disable the registration feature.
Figure 29A:
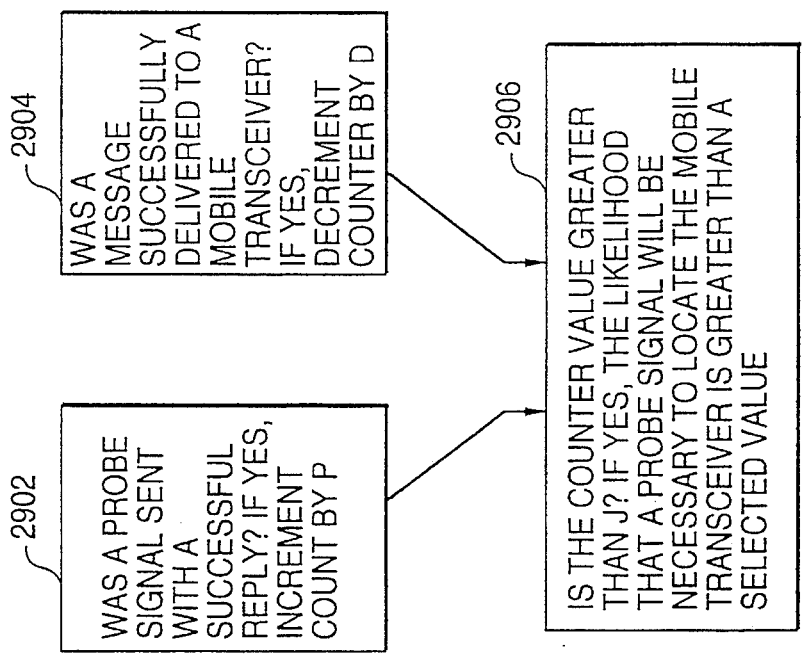
FIG. 29(A) is a flow chart of a preferred evaluation method used to enable the registration feature.

Referring now to FIG. 29(A), therein is shown a series of substeps which are preferably performed during the implementation of the processing step 2804 shown in FIG. 28(A). In particular, steps 2902 and 2904 are event driven and only proceed to the next step after an input has been received by the network. Step 2902 determines if the network sent a probe signal to a lost mobile transceiver unit and if a reply to the probe signal was received by a base receiver in the network. If this event occurs, a counter (not shown) is incremented by a value P by the central computer 2002.

In step 2904, if a message was successfully delivered to a mobile transceiver, preferably including an acknowledgment signal return from the mobile transceiver to the network, the counter (not shown) in the central computer 2002 is decremented by a value D.

After the occurrence of either of the events tested for in step 2902 or step 2904, the algorithm proceeds to step 2906. In step 2906, if the counter value is greater than a predetermined value J, this indicates that the likelihood that a probe signal will be necessary to locate the mobile transceiver is greater than a selected value.

As can be seen, the process of substeps in FIG. 29(A) balances the frequency of probe signals sent to a particular unit against the number of successfully delivered messages to that unit. If the system must send a large number of probe signals, it would be useful to enable the registration feature by setting the registration flag on that mobile unit to enable the registration feature. In contrast, if many messages have been successfully delivered without requiring a probe signal, it is unnecessary to enable the registration feature by setting the registration flag.

In step 2808, a message is sent to the mobile unit to enable the mobile transceiver's capability to transmit a registration signal if the calculated likelihood in step 2804 exceeds a selected value. As can be seen, step 2808 preferably sets the registration flag in the mobile transceiver unit.

Figure 28B:
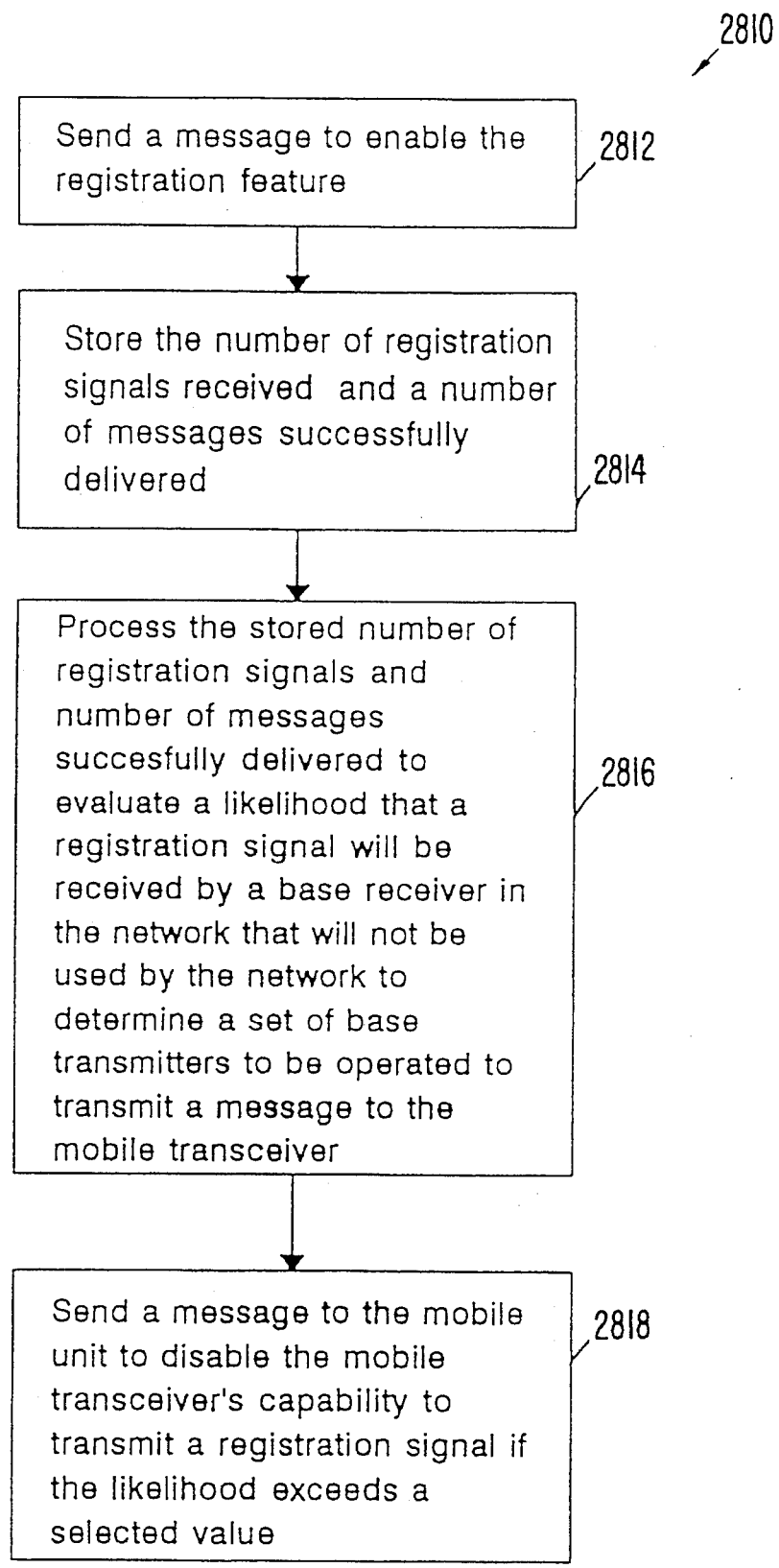
FIG. 28(B) is a flow chart of a preferred method to disable the registration feature of a mobile unit.

FIG. 28(B) shows a flow chart describing a method 2810 for implementing the registration concepts of the present invention wherein the registration feature of the mobile unit is enabled. In step 2812, the network sends a message to enable the registration feature (i.e. set the registration flag to 1) of the mobile unit to enable the mobile transceiver's capability to transmit a registration signal. As can be seen, step 2812 determines the initial state for the method set forth in FIG. 28(B).

In step 2814, the network stores the number of registration signals received by the network during a first period of time, and the number of messages successfully delivered to the mobile transceiver by the network during a second period of time. Preferably, the first and second time intervals are identical. The traffic statistics database 2200 of the database 2008 is preferably used to store the number of registration signals and successful messages for each mobile unit. As explained hereinafter, these two statistics from the operation of the network are preferably used to determine whether the registration by the mobile unit is useful.

In step 2816, the stored number of registration signals and number of messages successfully delivered is processed to evaluate the likelihood that a registration signal will be received by a base receiver in the network that will not be used by the network to determine a set of base transmitters to be operated to transmit a message to the mobile transceiver. The preferred embodiment of the invention processes the stored number of registration signals received and number of messages successfully delivered in accordance with the method set forth in FIG. 29(B).

Referring now to FIG. 29(B), therein is shown a series of substeps which are preferably performed during the implementation of the processing step 2814 shown in FIG. 28(B). In particular, steps 2912 and 2914 are event driven and only proceed to the next step after an input has been received by the network. Step 2912 determines if a registration signal was received by a base receiver in the network. If so, a counter (not shown) in the central computer 2002 is incremented by a value A.

In step 2914, if a message was successfully delivered to a mobile transceiver, preferably including an acknowledgment signal return from the mobile transceiver to the system, the counter (not shown) in the central computer 2002 is decremented by a value M.

It should be understood that the counter referred to with regard to steps 2912 and 2914 is different then the counter referred to with regard to steps 2902 and 2904 since each counter is only necessary when the registration feature is enabled or disabled in the mobile transceiver. However, the same physical or logical device may be used to implement both counters.

After the occurrence of either events in the step 2912 or step 2914, the algorithm proceeds to step 2916. In step 2916, the process determines if the counter value is greater than a predetermined value T. The value of T can be varied to meet the needs of a particular network. When the counter value exceeds T, it is indicated that the likelihood that a registration signal from that mobile unit will not be used by the network to determine a new set of base transmitters, and therefore the registration status for that mobile unit needs to be changed to disable the registration feature.

In other words, the process in FIG. 29(B) balances the frequency of registration signals sent by a particular unit against the number of successfully delivered messages to that unit. As can be seen, if the mobile unit sends a large number of registration signals without the system using these registration signals, it would be useful to have the registration feature on that mobile unit disabled. In contrast, if many messages have been successfully delivered without too many registration signals being sent by the mobile unit, it is unnecessary for the registration feature to be disabled.

In step 2818, a message is sent to the mobile unit to disable the mobile transceiver's capability to transmit a registration signal if the calculated likelihood in step 2814 exceeds a selected value. As can be seen, step 2818 may preferably remove the registration flag in the mobile transceiver unit.

Of course, it should be understood that the variables P, D, and J used in FIG. 29(A), and the variables A, M, and T used in FIG. 29(B) can be adjusted as desired to enhance system performance, as will be apparent to one of ordinary skill in the art. The counters can be implemented with so-called "reflective boundaries" so that if a counter reaches a minimum value (e.g., zero), it will continuously reset to that minimum value when further decremented.

It will be apparent to those skilled in the art that various modifications and variations can be made in the systems and methods of the present invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A communication method for controlling a mobile transceiver which may communicate with a communication network controlled by a computer, the network including a plurality of base transmitters for transmitting messages from the network to the mobile transceiver and base receivers for receiving messages from the mobile transceiver, the mobile transceiver being capable of sending registration signals to be received by a base receiver in the network to allow the network to identify the mobile transceiver's approximate location according to the location of the base receiver(s) that received the registration signals and being capable of sending a message acknowledgment signal when the mobile transceiver receives a message from the network to indicate successful delivery of the message, and the plurality of base transmitters in the network being capable of sending a probe signal to the mobile transceiver to cause the mobile transceiver to transmit a probe acknowledgment signal to be received by a base receiver in the network to allow the network to identify the mobile transceiver's approximate location according to the location of the base receiver that received the acknowledgment signal, the method comprising the steps of:

(a) sending a message from the network to the mobile transceiver to disable the mobile transceiver's capability to transmit registration signals;

(b) storing in the network the number of probe signals sent by the network to the mobile transceiver during a first period of time and the number of messages successfully delivered to the mobile transceiver by the network during a second period of time;

(c) determining a likelihood that a probe signal will be required to be sent by the network to deliver a message by evaluating the stored number of probe signals and stored number of messages successfully delivered; and (d) sending a message to the mobile transceiver to enable the mobile transceiver's capability to transmit a registration signal if the calculated likelihood exceeds a selected value.

2. The communication method of claim 1, further comprising the step of:

sending a registration signal from the mobile transceiver to the network when the mobile transceiver crosses zonal boundaries and the mobile transceiver's capability to transmit registration signals is enabled.

3. The communication method of claim 1, further comprising the step of:

sending a registration signal from the mobile transceiver to the network when the mobile transceiver returns to a coverage area of the communication network after being out of range for a period of time and the mobile transceiver's capability to transmit registration signals is enabled.

4. The communication method of claim 1, further comprising the step of:

sending a registration signal from the mobile transceiver to the network when power is first applied to the mobile transceiver and the mobile transceiver's capability to transmit registration signals is enabled.

5. A communication method for controlling a mobile transceiver which may communicate with a communication network controlled by a computer, the network including a plurality of base transmitters for transmitting messages to the mobile transceiver and base receivers for receiving messages from the mobile transceiver, the mobile transceiver being capable of sending registration signals to be received by a base receiver in the network to allow the network to identify the mobile transceiver's approximate location according to the location of the base receiver(s) that received the registration signals and being capable of sending a message acknowledgment signal when the mobile transceiver receives a message from the network to indicate successful delivery of the message, the network using received registration signals to determine a set of base transmitters to be operated to transmit a message to the mobile transceiver, the method comprising the steps of:

(a) storing in the network the number of registration signals from the mobile transceiver to the network during a first period of time and the number of messages successfully delivered to the mobile transceiver by the network during a period of time;

(b) processing the stored number of registration signals and number of messages successfully delivered to evaluate a likelihood that a registration signal from said mobile transceiver will not be used by the network to determine a set of base transmitters; and (c) sending a message to the mobile transceiver to disable the mobile transceiver's capability to transmit a registration signal if the likelihood exceeds a selected value.

6. The communication method of claim 5, further comprising the step of:

sending a registration signal from the mobile transceiver to the network when the mobile transceiver crosses zonal boundaries and the mobile transceiver's capability to transmit registration signals is enabled.

7. The communication method of claim 5, further comprising the step of:

sending a registration signal from the mobile transceiver to the network when the mobile transceiver returns to a coverage area of the communication network after being out of range for a period of time and the mobile transceiver's capability to transmit registration signals is enabled.

8. The communication method of claim 5, further comprising the step of:

sending a registration signal from the mobile transceiver to the network when power is first applied to the mobile transceiver and the mobile transceiver's capability to transmit registration signals is enabled.

9. A communication method implemented in a computer controlled communication network for locating a mobile transceiver within a region of space, the region of space being divided into a plurality of zones with each zone serviced by at least one base transmitter and at least one base receiver, the network storing data corresponding to a zone where the mobile transceiver was last known to be located, the communication method comprising the steps of:

(a) transmitting a message signal by a base transmitter servicing a zone where the mobile transceiver was last known to be located;

(b) transmitting a systemwide probe signal by a plurality of base transmitters servicing a plurality of zones if the mobile transceiver does not indicate receipt of the message signal from the base transmitter;

(c) receiving the systemwide probe signal by the mobile transceiver;

(d) transmitting an acknowledgment signal by the mobile transceiver in response to the received systemwide probe signal;

(e) receiving the acknowledgment signal from the mobile transceiver by a base receiver;

(f) updating the data stored in the network to reflect the zone of the base receiver that received the acknowledgment signal as the last known location of the mobile transceiver;

(g) determining whether failure of the mobile transceiver to receive the message transmitted in step (a) is likely caused by inter-zonal interference; and (h) retransmitting the message signal systemwide when the network determines that failure of the mobile transceiver to receive the message transmitted in step (a) is likely caused by inter-zonal interference.

10. A communication method implemented in a computer controlled communication network for locating a mobile transceiver within a region of space, the region of space being divided into a plurality of zones with each zone serviced by at least one base transmitter and at least one base receiver, the network storing data corresponding to a zone where the mobile transceiver was last known to be located, the communication method comprising the steps of:

(a) transmitting a message signal by a base transmitter servicing a zone where the mobile transceiver was last known to be located;

(b) transmitting a systemwide probe signal by a plurality of base transmitters servicing a plurality of zones if the mobile transceiver does not indicate receipt of the message signal from the base transmitter;

(c) receiving the systemwide probe signal by the mobile transceiver;

(d) transmitting an acknowledgment signal by the mobile transceiver in response to the received systemwide probe signal;

(e) receiving the acknowledgment signal from the mobile transceiver by a base receiver;

(f) updating the data stored in the network to reflect the zone of the base receiver that received the acknowledgment signal as the last known location of the mobile transceiver;

(g) determining whether failure of the mobile transceiver to receive the message transmitted in step (a) is likely caused by the mobile unit being located in a weak signal area within a zone; and (h) retransmitting the message signal in the zone where the mobile transceiver was last known to be located using an error correcting code when the network determines that failure of the mobile transceiver to receive the message signal transmitted in step (a) is likely caused by the mobile unit being located in the weak signal area within a zone.

* * * * *